US010734617B2

(12) United States Patent
Sakai et al.

(10) Patent No.: US 10,734,617 B2
(45) Date of Patent: Aug. 4, 2020

(54) BATTERY MODULE, POWER TOOL, AND ELECTRONIC APPARATUS

(71) Applicant: Murata Manufacturing Co., Ltd., Kyoto (JP)

(72) Inventors: Hirotaka Sakai, Fukishima (JP); Fumihiko Suzuki, Fukishima (JP); Yasushi Mori, Fukishima (JP); Kenichi Ozawa, Fukishima (JP)

(73) Assignee: Murata Manufacturing Co., Ltd., Kyoto (JP)

(*) Notice: Subject to any disclaimer, the term of this patent is extended or adjusted under 35 U.S.C. 154(b) by 310 days.

(21) Appl. No.: 15/746,289

(22) PCT Filed: Jul. 22, 2016

(86) PCT No.: PCT/JP2016/003432
§ 371 (c)(1),
(2) Date: Jan. 19, 2018

(87) PCT Pub. No.: WO2017/013883
PCT Pub. Date: Jan. 26, 2017

(65) Prior Publication Data
US 2018/0212214 A1    Jul. 26, 2018

(30) Foreign Application Priority Data

Jul. 22, 2015    (JP) .................................. 2015-145276

(51) Int. Cl.
*H01M 2/10*    (2006.01)
*H01M 10/42*    (2006.01)
(Continued)

(52) U.S. Cl.
CPC ......... *H01M 2/1066* (2013.01); *H01M 2/204* (2013.01); *H01M 2/30* (2013.01);
(Continued)

(58) Field of Classification Search
CPC ...... H01M 2/1066; H01M 2/30; H01M 2/204; H01M 10/425; H01M 2010/4271
See application file for complete search history.

(56) References Cited

U.S. PATENT DOCUMENTS

2007/0141457 A1*  6/2007  Amagai ............... H01M 2/021
                                                 429/152
2008/0286647 A1* 11/2008  Naito .................... H01M 2/105
                                                 429/149
(Continued)

FOREIGN PATENT DOCUMENTS

JP    11126585      5/1999
JP    2010123299    6/2010
(Continued)

OTHER PUBLICATIONS

International Search Report (with English translation) dated Oct. 18, 2016 in corresponding international application No. PCT/JP2016/003432 (5 pages).
(Continued)

*Primary Examiner* — Ula C Ruddock
*Assistant Examiner* — Matthew W Van Oudenaren
(74) *Attorney, Agent, or Firm* — K&L Gates LLP

(57) ABSTRACT

A battery module includes a plurality of flat or square type batteries that each have a positive terminal and a negative terminal; a holder that has an opening, and retains the batteries in such a manner that the positive terminal and the negative terminal are positioned toward the opening, and that the principal surfaces of the batteries face each other; a cover that is disposed over the opening; a circuit board that is disposed over the cover; and a plurality of connection members that are disposed between the cover and the circuit board to electrically connect the positive terminal and nega-
(Continued)

tive terminal. Some of the connection members retain a peripheral portion of the circuit board.

20 Claims, 34 Drawing Sheets

(51) Int. Cl.
  *H01M 2/20* (2006.01)
  *H01M 2/30* (2006.01)
  *B25F 5/02* (2006.01)
(52) U.S. Cl.
  CPC ............. *H01M 10/425* (2013.01); *B25F 5/02* (2013.01); *H01M 2010/4271* (2013.01)

(56) References Cited

U.S. PATENT DOCUMENTS

| | | | |
|---|---|---|---|
| 2010/0124693 A1* | 5/2010 | Kosugi | G01R 31/3644 429/92 |
| 2010/0181966 A1* | 7/2010 | Sakakibara | B25F 5/00 320/136 |
| 2012/0121939 A1* | 5/2012 | Yoo | G01K 1/14 429/7 |
| 2012/0141861 A1* | 6/2012 | Uchida | H01M 2/0404 429/159 |
| 2012/0156527 A1* | 6/2012 | Kataoka | H01M 2/204 429/7 |

FOREIGN PATENT DOCUMENTS

| | | | |
|---|---|---|---|
| JP | 2011-171114 | A | 9/2011 |
| JP | 2011-181369 | A | 9/2011 |
| JP | 2012-128982 | A | 7/2012 |
| JP | 2012-212601 | A | 11/2012 |
| JP | 2013-077433 | A | 4/2013 |
| JP | 2014-132585 | A | 7/2014 |
| JP | 2015-082493 | A | 4/2015 |
| JP | 2015082493 | * | 4/2015 |
| WO | 2011/027817 | A1 | 3/2011 |
| WO | 2014/024450 | A1 | 2/2014 |
| WO | 2014/034079 | A1 | 3/2014 |
| WO | 2016/203891 | | 3/2018 |

OTHER PUBLICATIONS

Written Opinion dated Oct. 18, 2016 in corresponding international application No. PCT/JP2016/003432 (5 pages).
Japanese Office Action dated Mar. 19, 2019 in corresponding Japanese Application No. 2017-529465.
Japanese Office Action dated Oct. 1, 2019 in corresponding Japanese Application No. 2017-529465.
Chinese Office Action dated Dec. 26, 2019 in corresponding Chinese Application No. 201680041352.9.

* cited by examiner

FIG.1
A
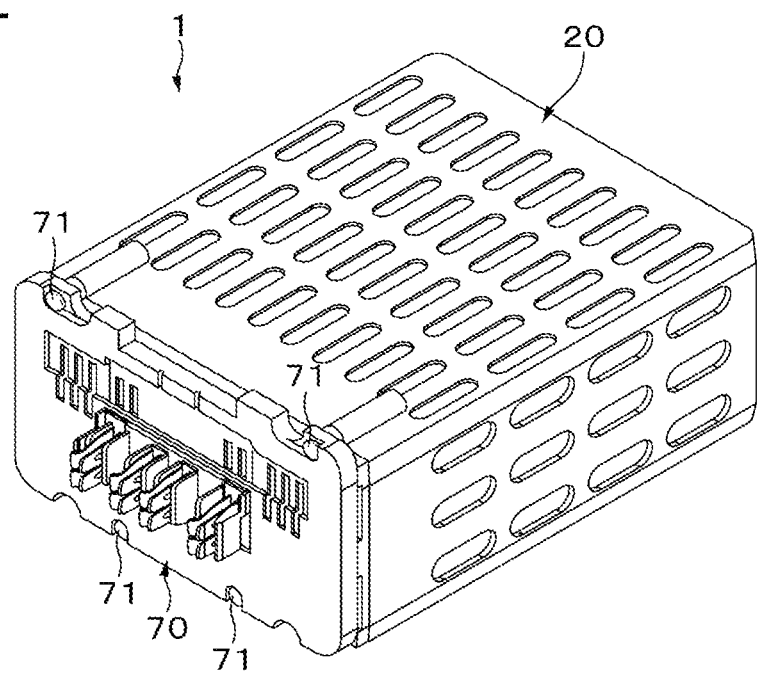
B
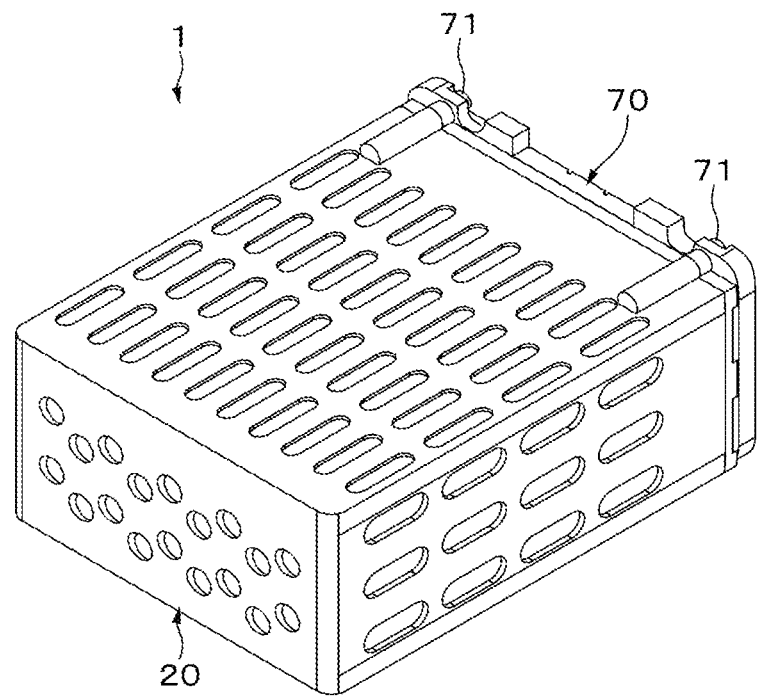

FIG.3
A
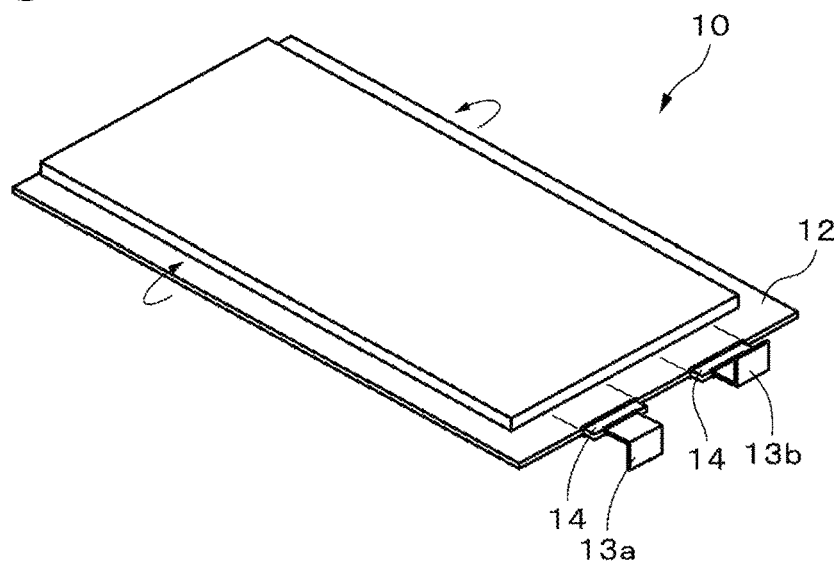
B
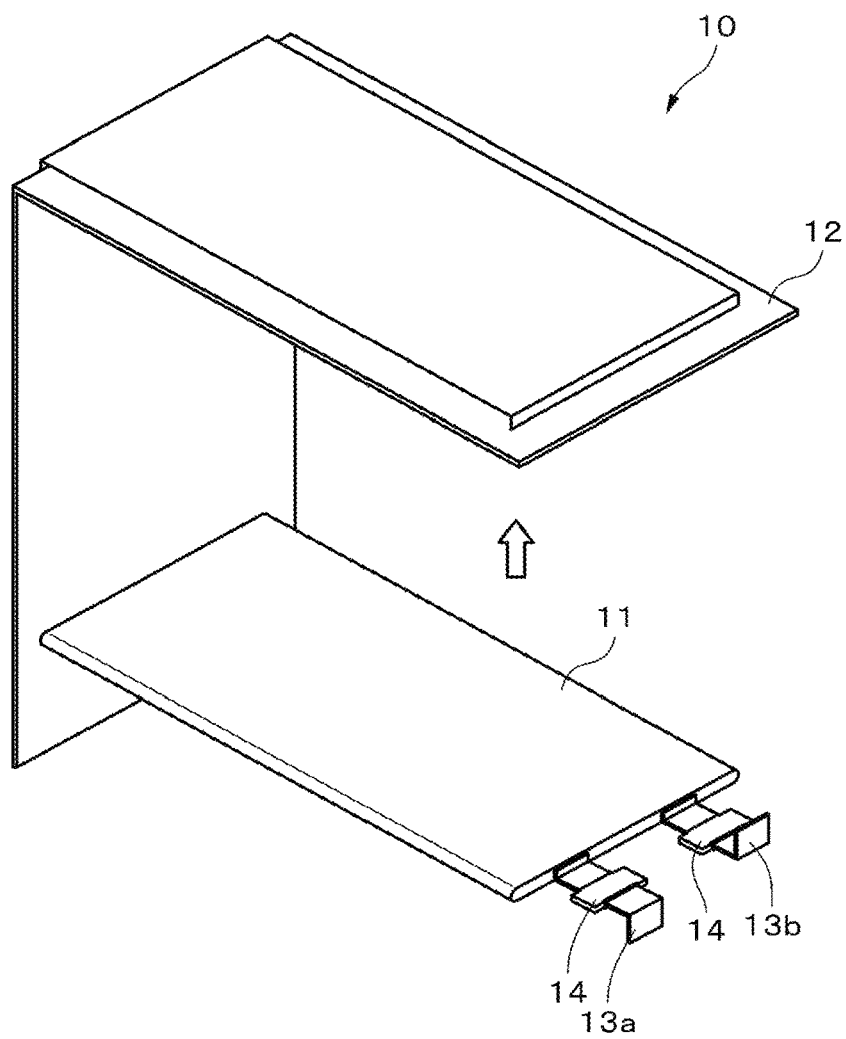

FIG. 6
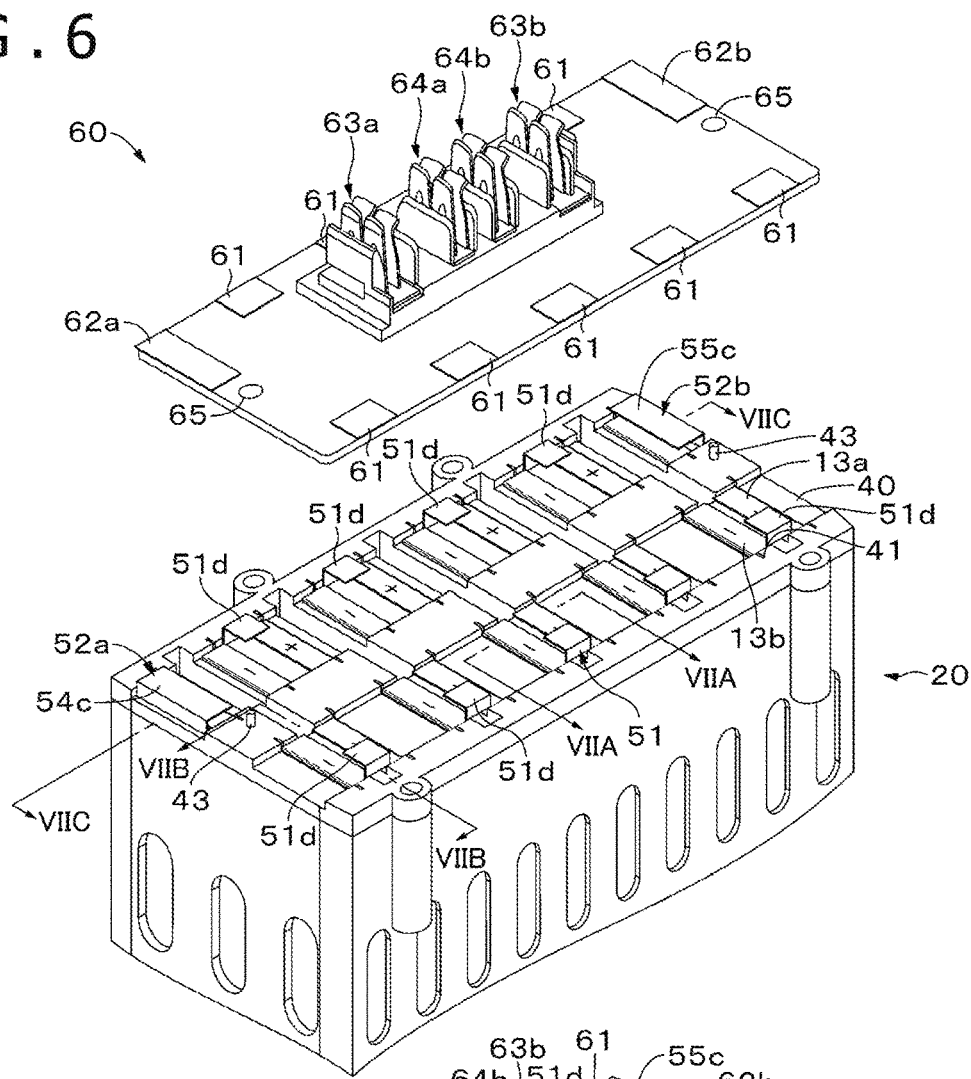
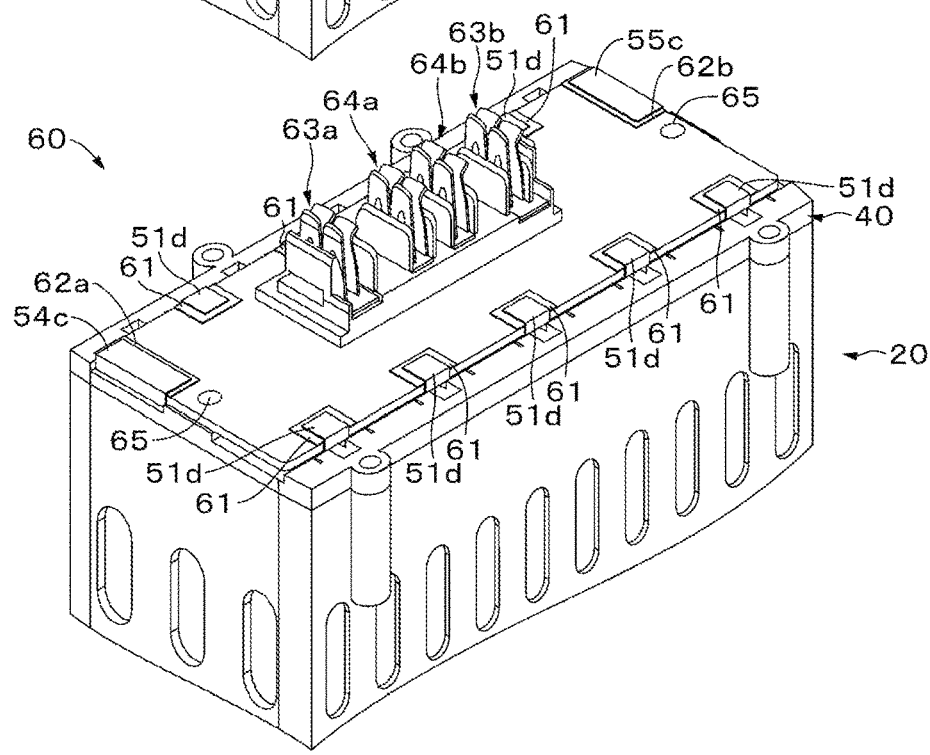

FIG. 7
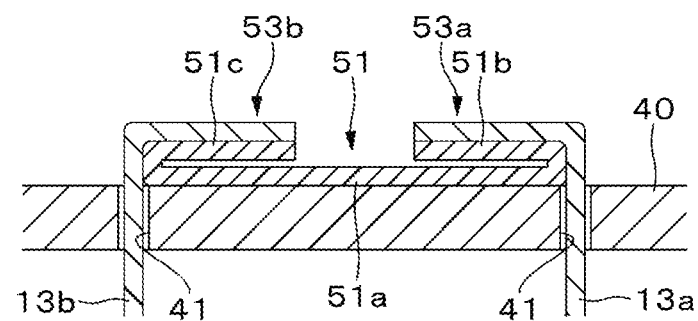
A
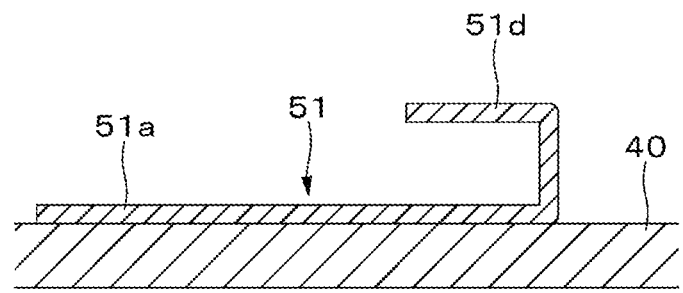
B
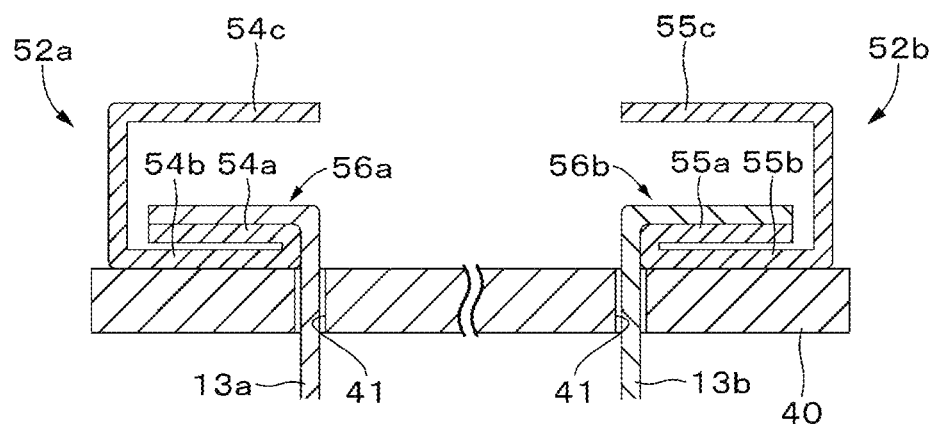
C

FIG. 10
A
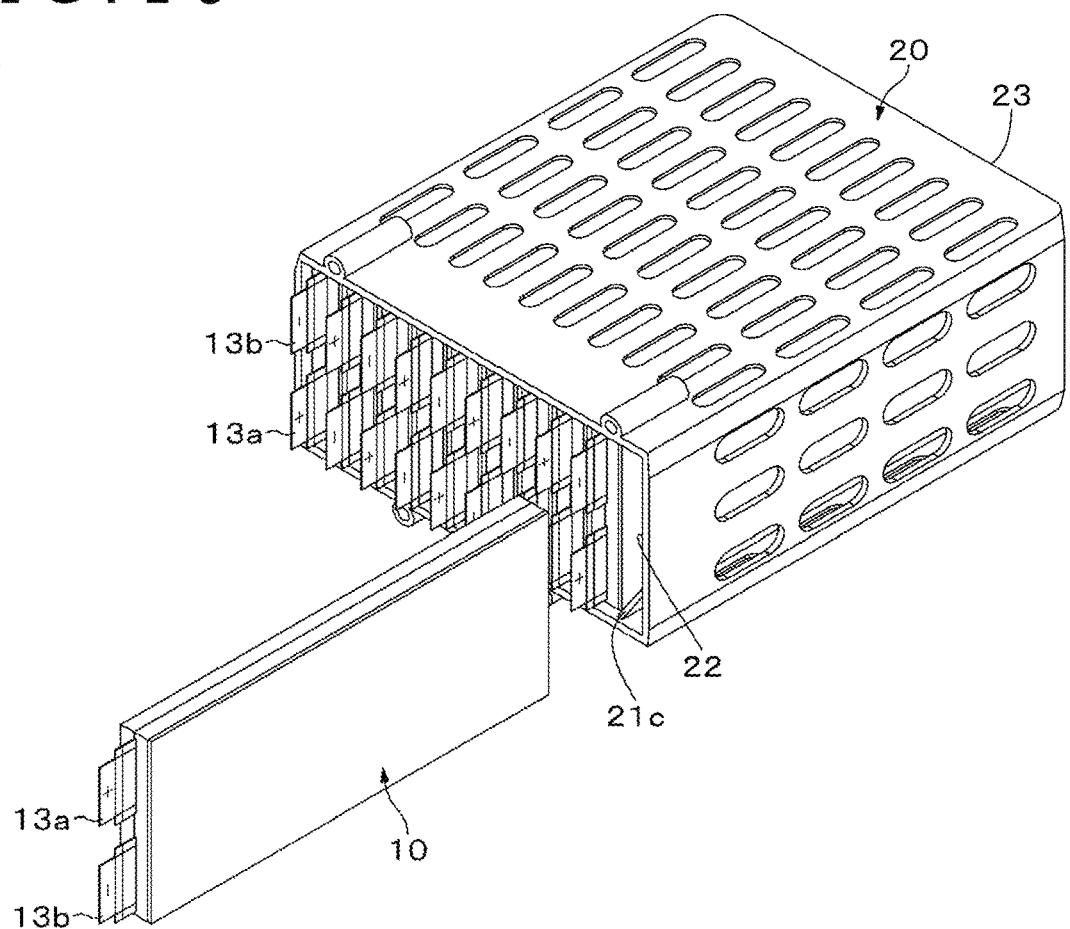
B
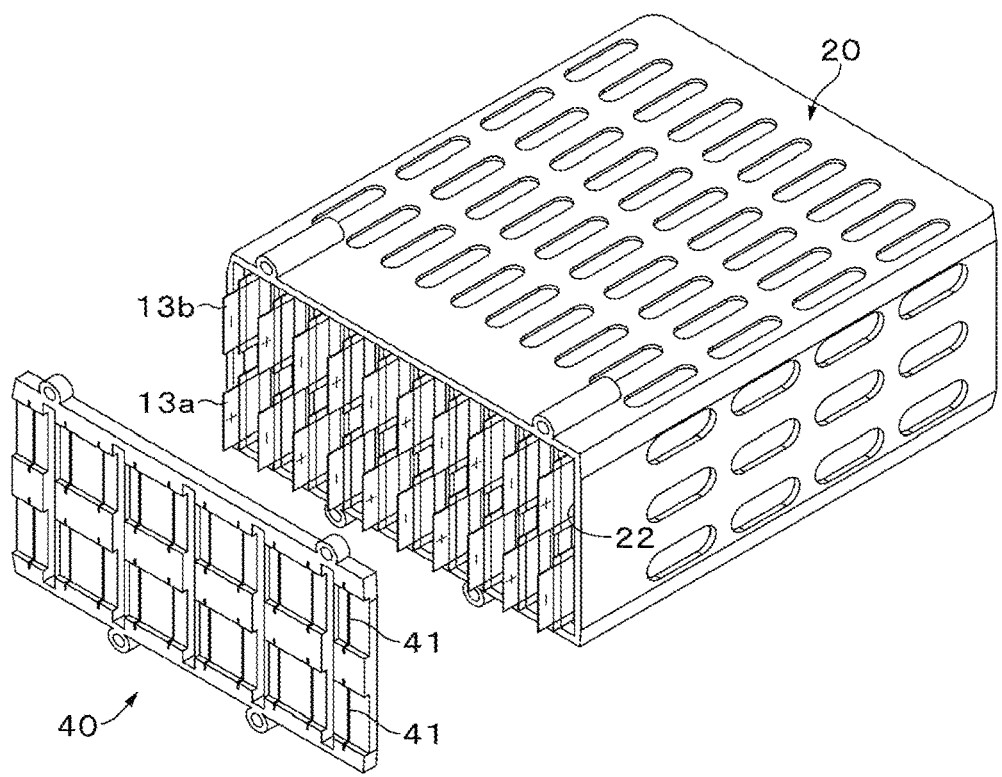

FIG. 11
A
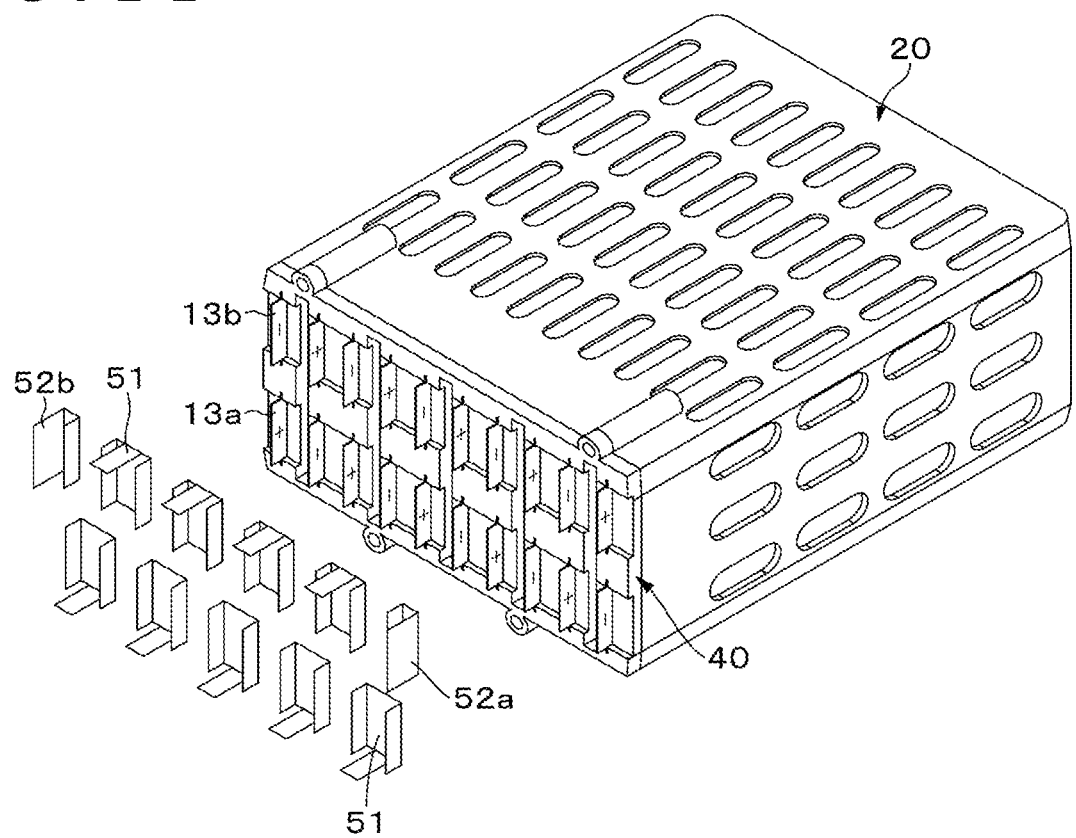
B
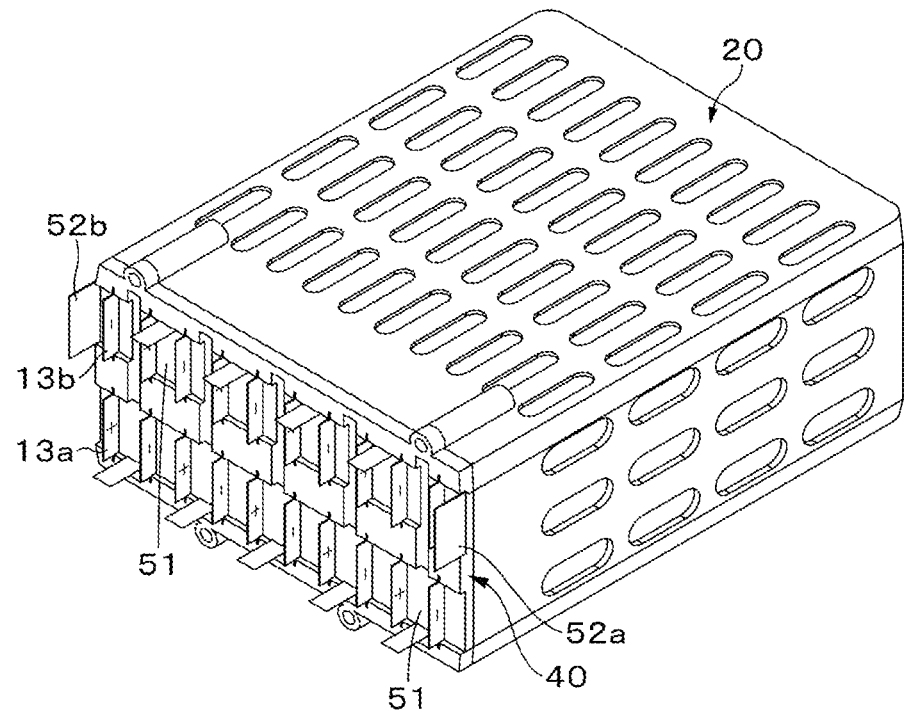

FIG.12
A
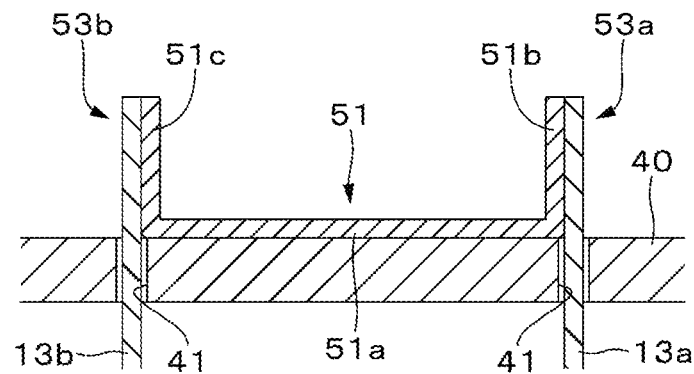
B
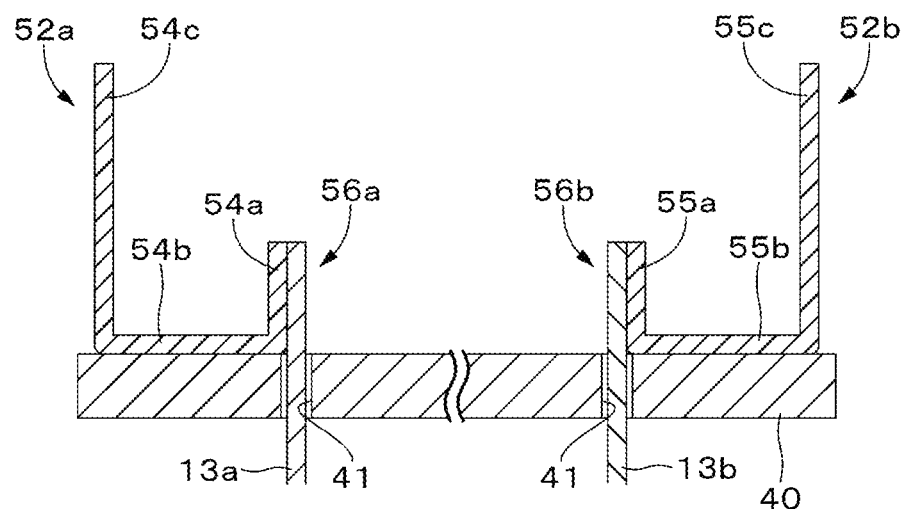

A    B

FIG.14
A
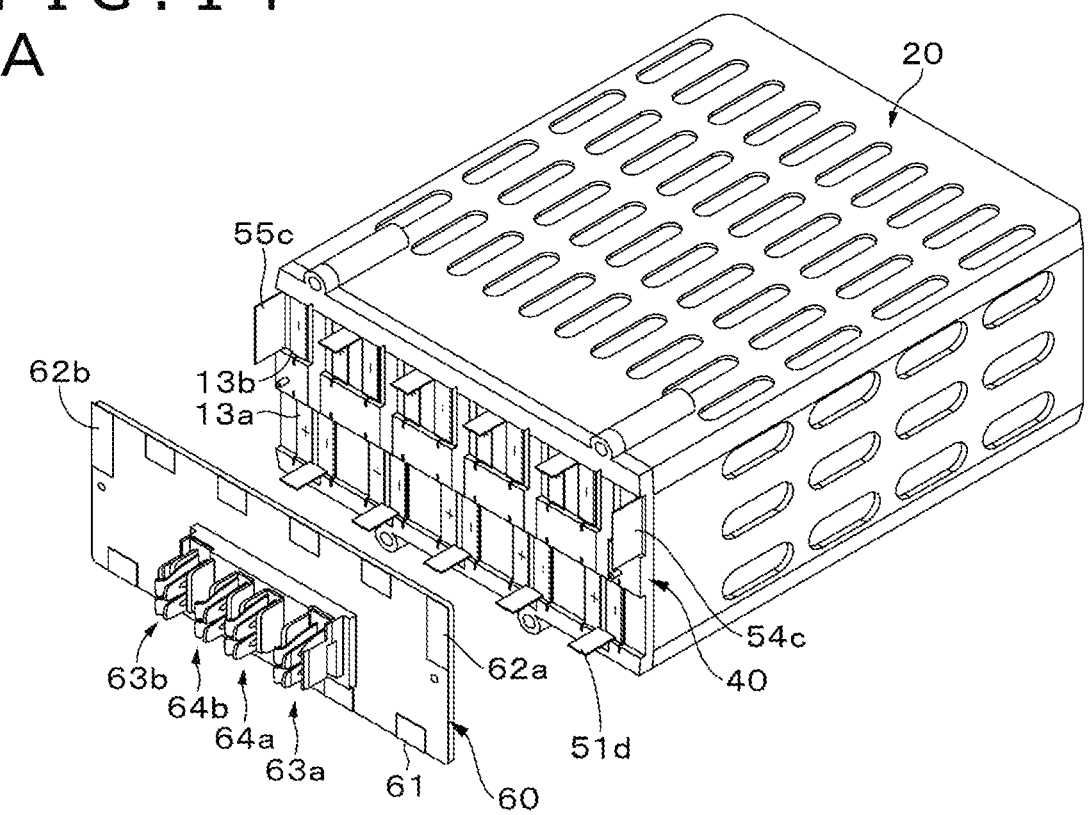
B
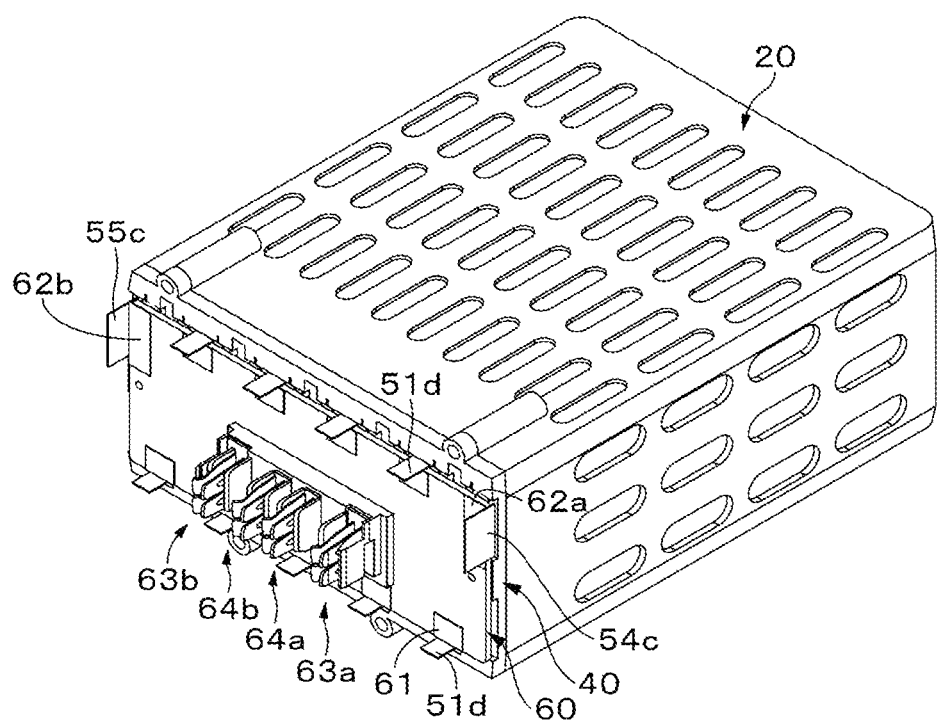

FIG.15
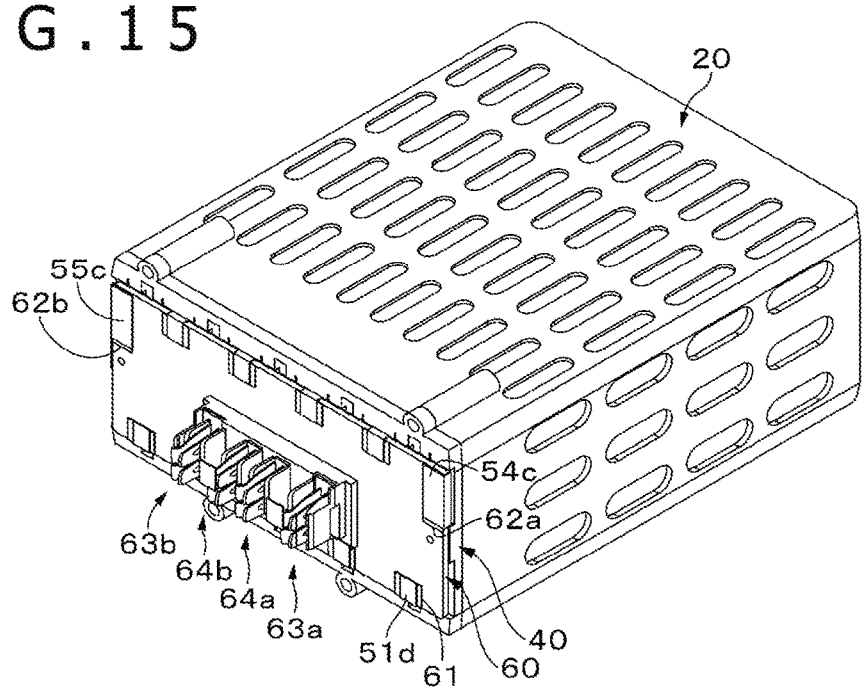
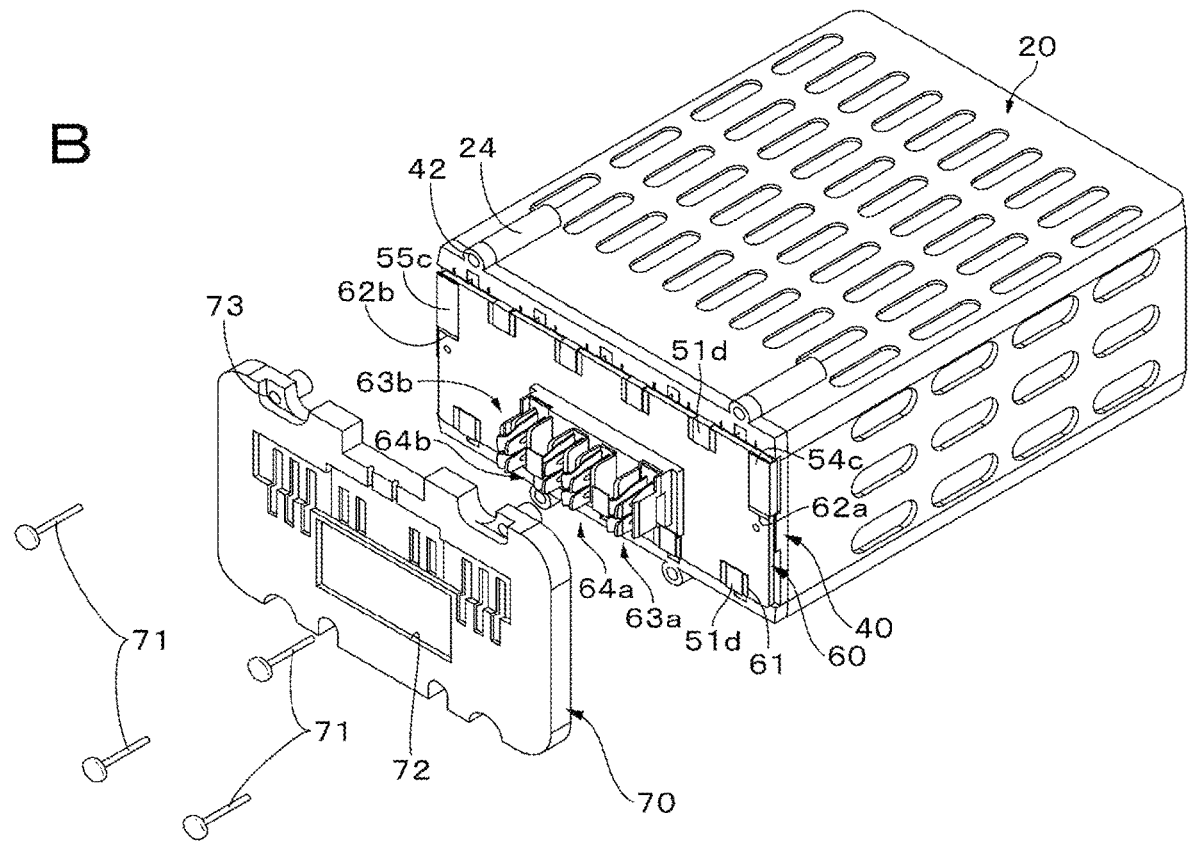

FIG.18
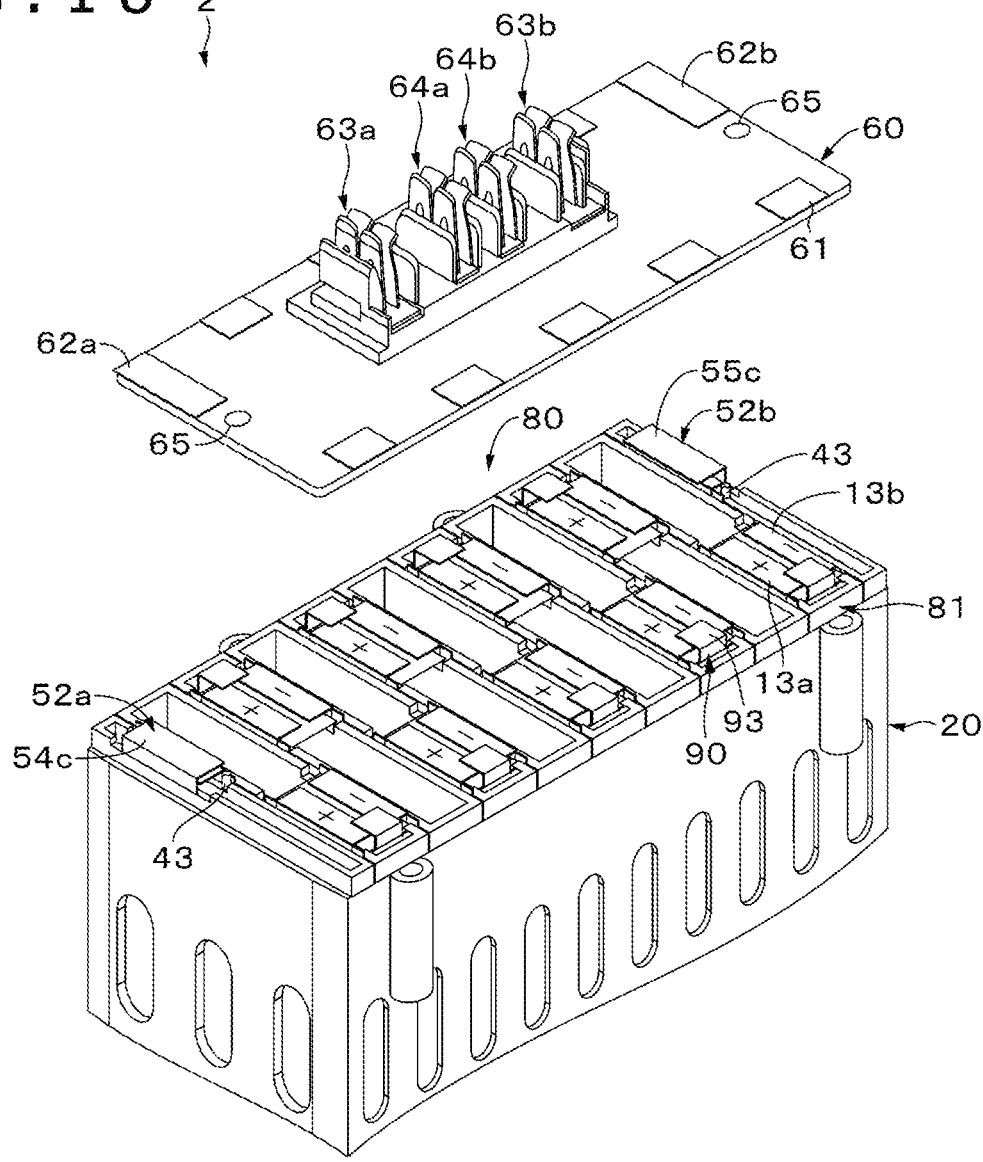
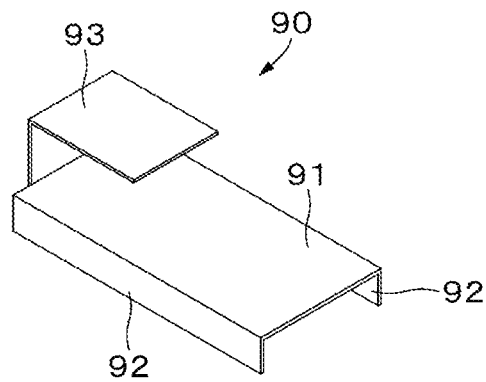

FIG.25
A 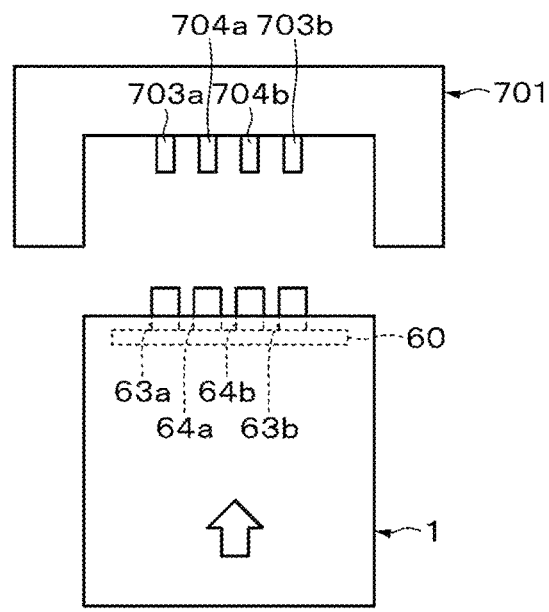
B 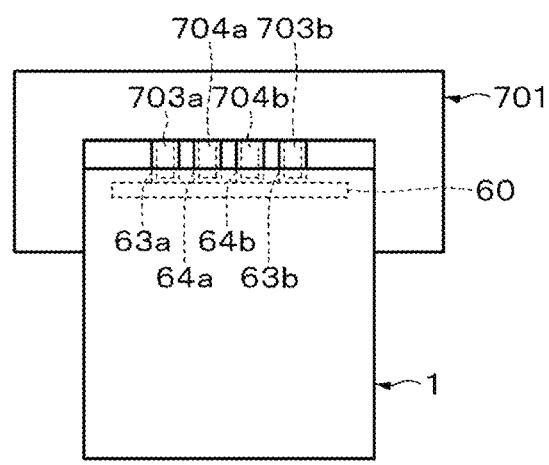
C 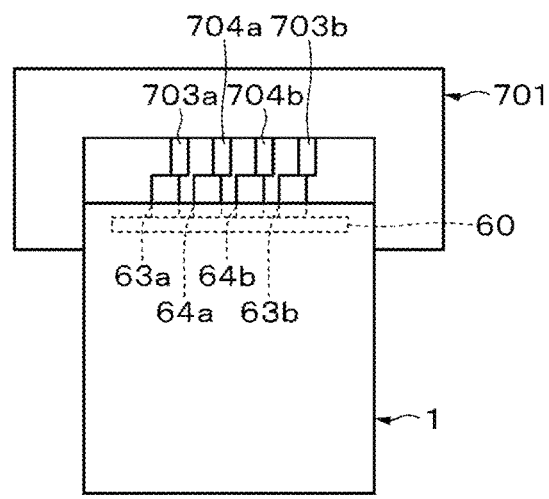

FIG. 27
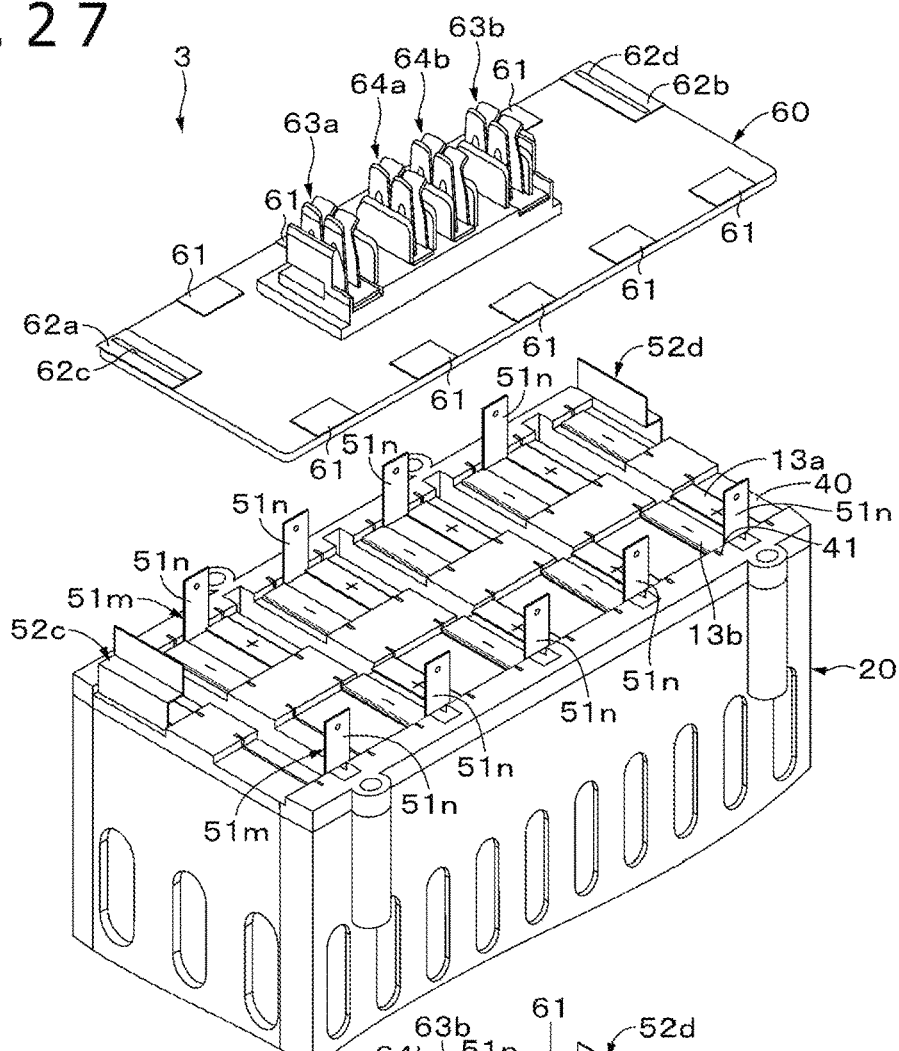
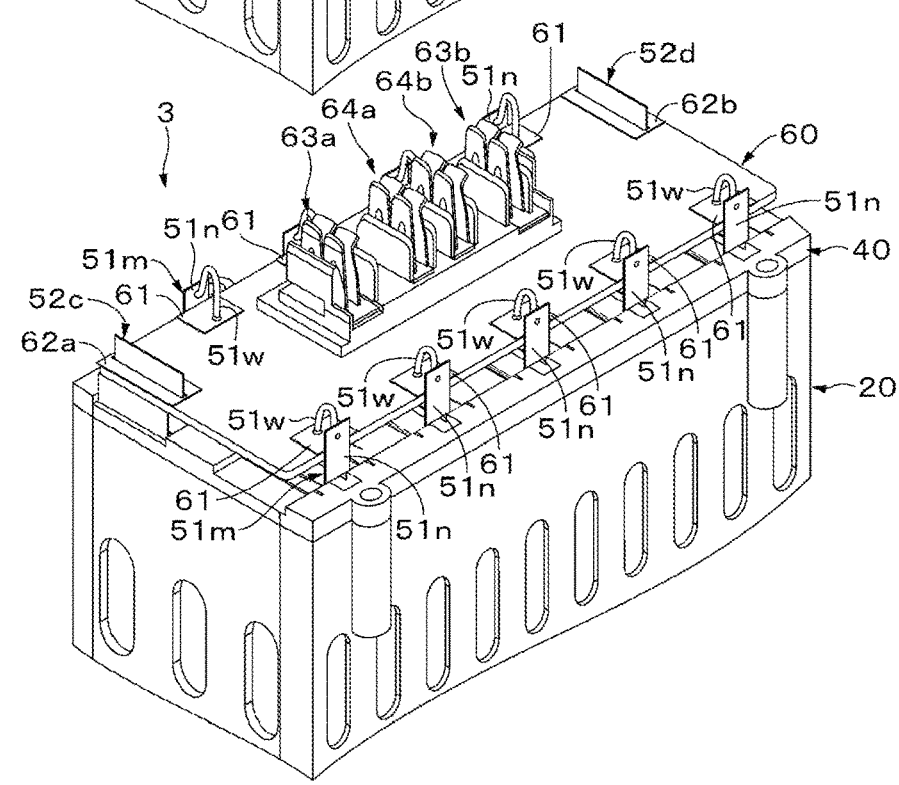

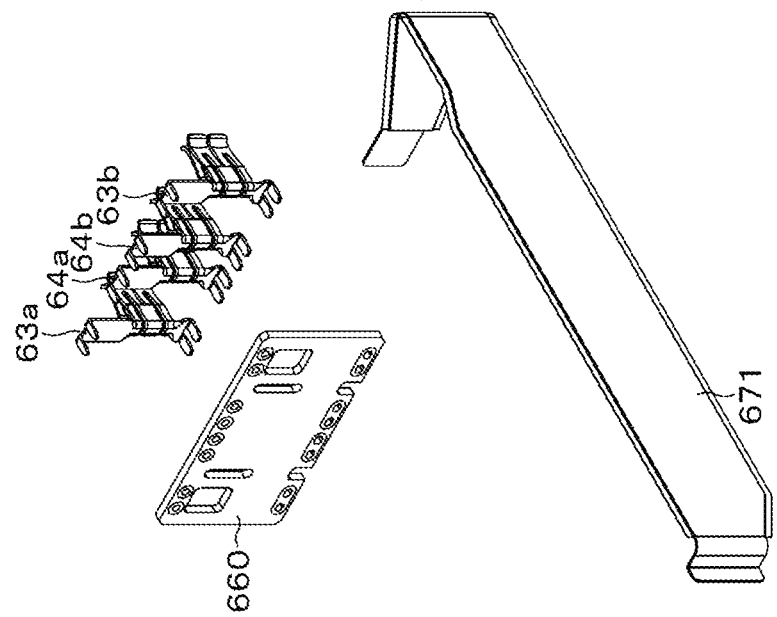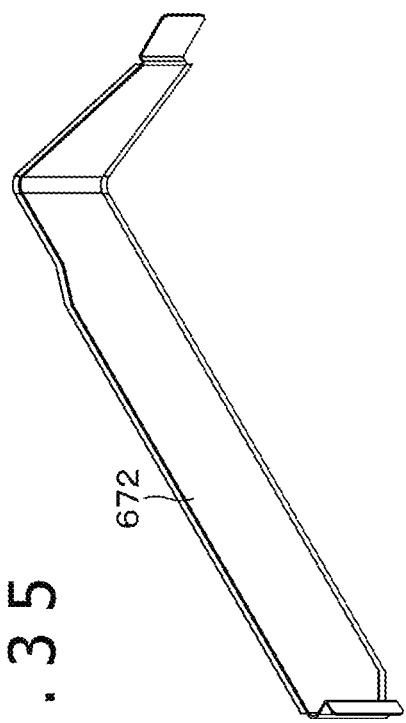
FIG. 35

BATTERY MODULE, POWER TOOL, AND ELECTRONIC APPARATUS

CROSS-REFERENCE TO RELATED APPLICATIONS

The present application claims the benefit of International Application No. PCT/JP2016/003432, filed Jul. 22, 2016, which claims priority to Japanese Application No. 2015-145276, filed Jul. 22, 2015, the disclosures of which are incorporated herein by reference.

BACKGROUND

The present technology relates to a battery module, and also relates to a power tool and an electronic apparatus that both include the battery module.

In recent years, a plurality of rechargeable batteries are often connected to an apparatus or vehicle that requires a high capacity and a high output, and used as a battery module. Technologies proposed, for instance, in PTL 1 to 3 configure a battery module by connecting a plurality of flat laminate film batteries. It is demanded that such a battery module be vibration resistant.

CITATION LIST

Patent Literature

[PTL 1]
    JP 2011-181369A
[PTL 2]
    JP 2011-171114A
[PTL 3]
    JP 2012-212601A

SUMMARY

An object of the present technology is to provide a highly vibration-resistant battery module. Another object is to provide a power tool and an electronic apparatus that both include the highly vibration-resistant battery module.

Solution to Problems

In accomplishing the above objects, according to an aspect of the present technology, there is provided a battery module including a plurality of flat or square type batteries, a holder, a cover, a circuit board, and a plurality of connection members. The batteries each have a positive terminal and a negative terminal. The holder has an opening, and retains the batteries in such a manner that the principal surfaces of the batteries face each other. The positive terminal and the negative terminal are positioned on the side toward the opening. The cover is disposed over the opening. The circuit board is disposed over the cover. The connection members electrically connect the positive terminal and negative terminal. Some of the connection members retain a peripheral portion of the circuit board.

According to another aspect of the present technology, there is provided a battery module including a plurality of flat or square type batteries, a holder, a cover, a circuit board, and a plurality of connection members. The batteries each have a positive terminal and a negative terminal. The holder has an opening, and retains the batteries in such a manner that the principal surfaces of the batteries face each other. The positive terminal and the negative terminal are positioned on the side toward the opening. The cover is disposed over the opening. The circuit board is disposed over the cover. The connection members are electrically connected to the positive terminal and to the negative terminal. The connection members retain a peripheral portion of the circuit board.

A power tool and an electronic apparatus according to an aspect of the present technology include the above-described battery module.

Advantageous Effects of Invention

As described above, the present technology is able to implement a highly vibration-resistant battery module.

BRIEF DESCRIPTION OF DRAWINGS

FIG. 1A is a perspective view illustrating the external appearance of the front side of a battery module according to a first embodiment of the present technology. FIG. 1B is a perspective view illustrating the external appearance of the rear side of the battery module according to the first embodiment of the present technology.

FIG. 3A is a perspective view illustrating the external appearance of a laminate film battery. FIG. 3B is an exploded perspective view illustrating the configuration of the laminate film battery.

FIG. 6A is an exploded perspective view illustrating a circuit board retention mechanism. FIG. 6B is a perspective view illustrating the circuit board retention mechanism.

FIG. 7A is a cross-sectional view taken along line VIIA-VIIA of FIG. 6A. FIG. 7B is a cross-sectional view taken along line VIIB-VIIB of FIG. 6A. FIG. 7C is a cross-sectional view taken along line VIIC-VIIC of FIG. 6A.

FIGS. 10A and 10B are process charts illustrating a battery module assembly procedure.

FIGS. 11A and 11B are process charts illustrating the battery module assembly procedure.

FIGS. 12A to 12B are process charts illustrating the battery module assembly procedure.

FIGS. 14A and 14B are process charts illustrating the battery module assembly procedure.

FIGS. 15A and 15B are process charts illustrating the battery module assembly procedure.

FIG. 18A is a perspective view illustrating a configuration of the battery module according to a second embodiment of the present technology. FIG. 18B is a perspective view illustrating a configuration of a tab.

FIG. 25A is a schematic diagram illustrating terminals between the battery module and an apparatus. FIG. 25B is a schematic diagram illustrating a situation where the terminals are properly positioned between the battery module and the apparatus. FIG. 25C is a schematic diagram illustrating a situation where the terminals are improperly positioned between the battery module and the apparatus.

FIG. 27A is an exploded perspective view illustrating a configuration of the battery module according to the third embodiment of the present technology. FIG. 27B is a perspective view illustrating the configuration of the battery module according to the third embodiment of the present technology.

FIG. 35 is an exploded perspective view illustrating the connection between an input/output terminal circuit board and busbars.

DETAILED DESCRIPTION

Embodiments of the present technology will now be described in the following order.
1 First Embodiment (an example of a battery module)
2 Second Embodiment (an example of the battery module)
3 Third Embodiment (an example of the battery module)
4 Fourth Embodiment (an example of the battery module)
5 Fifth Embodiment (an example of the battery module)
6 Sixth Embodiment (an example of a composite module)
7 Seventh Embodiment (an example of an electronic apparatus)
8 Eighth Embodiment (an example of a power storage system)
9 Ninth Embodiment (an example of an electric vehicle)
10 Tenth Embodiment (an example of a power tool)

1 First Embodiment

[Configuration of Battery Module]

Figure 2:
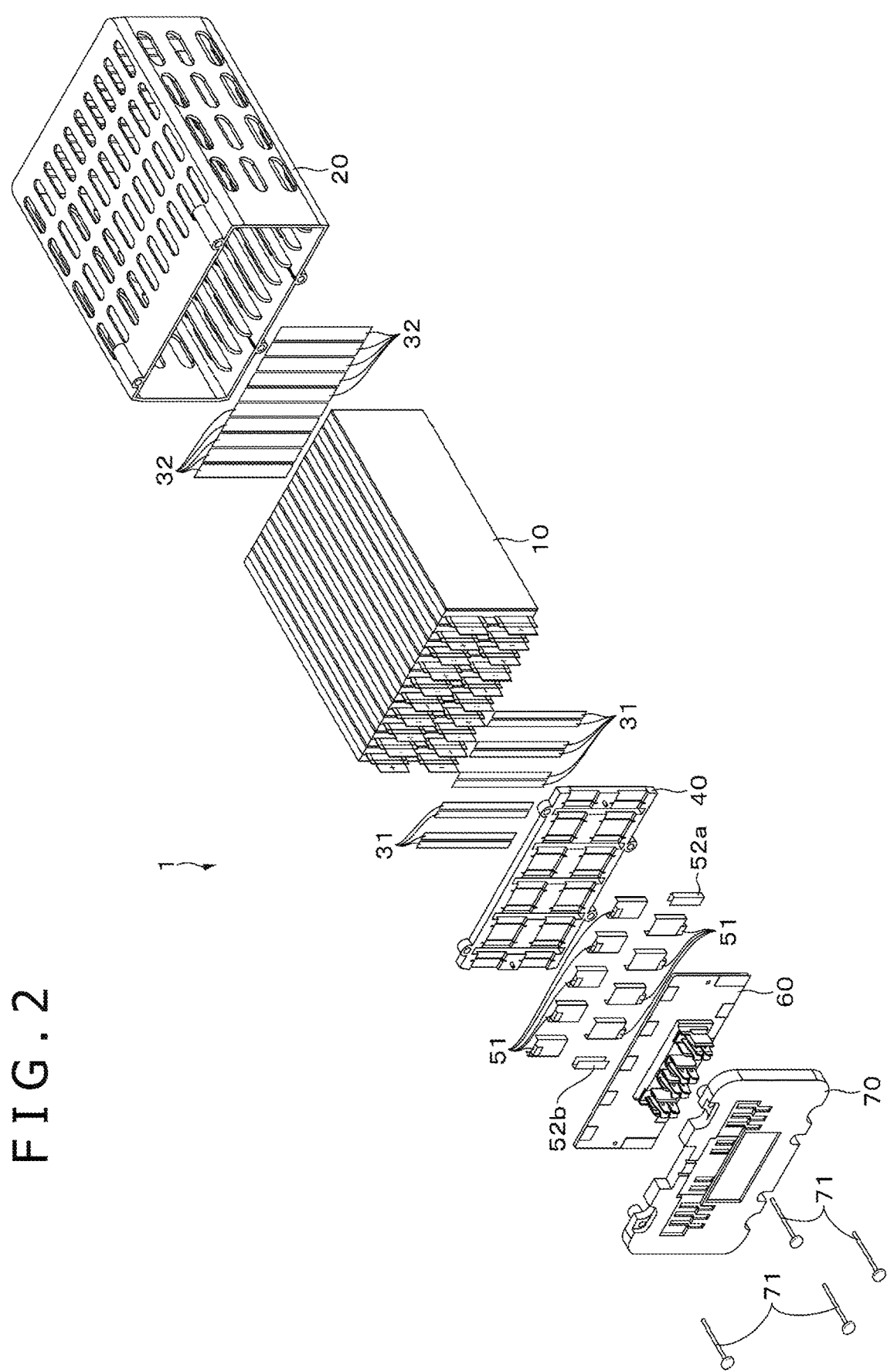
FIG. 2 is an exploded perspective view illustrating a configuration of the battery module according to the first embodiment of the present technology.

As illustrated in FIGS. 1A, 1B, and 2, a battery module 1 according to a first embodiment of the present technology includes a plurality of laminate film batteries (hereinafter simply referred to as the "batteries") 10, a holder 20, a cover 40, a circuit board 60, and a front member 70. The holder 20 accommodates and retains the batteries 10. The cover 40 is disposed at one end of the holder 20. The circuit board 60 is disposed over the cover 40. The front member 70 is disposed over the circuit board. A buffer 31 is disposed between the batteries 10 and the holder 20. A buffer 32 is disposed between the batteries 10 and the holder 20. A plurality of tabs 51, tabs 52a and 52b are disposed between the cover 40 and the circuit board 60. The cover 40 and the front member 70 are fastened to the holder 20 with a plurality of bolts 71 acting as fastening members in such a manner that the circuit board 60 is sandwiched between the cover 40 and the front member 70.

The components of the battery module 1, namely, the batteries 10, the holder 20, the buffers 31 and 32, the cover 40, the tabs 51, 52a, and 52b, the circuit board 60, and the front member 70, will now be sequentially described.

(Batteries)

As illustrated in FIG. 3A, the batteries 10 are flat or square type batteries such as lithium-ion batteries or lithium-ion polymer batteries. As illustrated in FIG. 3B, the batteries 10 are each formed by sealing a battery element 11 with a cladding 12, and can be reduced in weight and thinned. A positive lead (positive terminal) 13a and a negative lead (negative terminal) 13b are attached to the battery element 11. The end face side of the battery element 11 from which the positive lead 13a and the negative lead 13b are led out is hereinafter referred to as the top side, and the opposing end face side is hereinafter referred to as the bottom side. Lateral sides between the top side and the bottom side, which are opposing end faces, are referred to as the lateral sides. While the batteries 10 are accommodated and retained in the holder 20, the cladding 12 on both lateral sides is bent at substantially right angles to the principal surfaces of the batteries 10 as indicated by a solid-line arrow in FIG. 3A.

The positive lead 13a and the negative lead 13b are led, for instance, in the same direction from the inside of the cladding 12 to the outside. The leading ends of the positive lead 13a and negative lead 13b are bent at substantially right angles to their principal surfaces and in directions opposite to each other. The positive lead 13a and the negative lead 13b are formed of a metal material such as aluminum, copper, nickel, or stainless steel, and shaped like a thin plate or a net.

The batteries 10 each have a sealed portion. The sealed portion is provided on all or some sides of the batteries 10. FIGS. 3A and 3B depict an example in which the sealed portion is provided on top and lateral sides of the batteries 10. The sealed portion is formed, for example, by folding a rectangular cladding 12 at its center to sandwich the battery element 11, superimposing the folded sides one on top of the other, and bonding the superimposed folded sides together, for instance, by heat sealing. The sealed portion may alternatively be formed by sandwiching each of the batteries 10 between two rectangular claddings 12, superimposing the sides one on top of the other, and bonding the superimposed sides together, for instance, by heat sealing.

The cladding 12 is, for example, a flexible laminate film. The cladding 12 is configured, for example, by sequentially stacking a heat-sealing resin layer, a metal layer, and a surface protection layer. An adhesive layer may be disposed between the above-mentioned layers. It should be noted that the surface of a side toward the heat-sealing resin layer side serves as the surface of a side accommodating the battery element 11. The heat-sealing resin layer may be formed of a polymeric material such as polypropylene (PP) or polyethylene (PE). The metal layer may be formed of a metal material such as aluminum (Al) or its alloy. The surface protection layer may be formed of a polymeric material such as nylon (Ny). More specifically, the cladding 12 is formed, for example, of a rectangular aluminum laminate film that is obtained by attaching a nylon film, an aluminum foil, and a polyethylene film in the order named. The cladding 12 is disposed in such a manner that, for example, the battery element 11 faces the polyethylene film, and all the sides of the cladding 12 are stuck fast to each other by fusion or with an adhesive. A sticky film 14 is inserted between the cladding 12, the positive lead 13a, and the negative lead 13b in order to prevent the entry of outside air. The sticky film 14 is formed of a material adhesive to the positive lead 13a and the negative lead 13b, such as polyethylene, polypropylene, modified polyethylene, modified polypropylene, or other polyolefin resin.

For aesthetics of external appearance, the cladding 12 may further include a colored layer and/or at least one type of colorant-containing layer that is selected from among the heat-sealing layer, the surface protection layer, and the adhesive layer. More specifically, the cladding 12 may further include a colored layer on the surface of the surface protection layer, include a colorant-containing adhesive layer between the metal layer and the surface protection layer, or include a colorant-containing surface protection layer.

In place of the laminate film having the above-described structure, a laminate film having a different structure, a polypropylene film or other polymeric film, or a metal film may be used as the cladding 12.

The structure of the battery element 11 is not particularly limited. The battery element 11 may have, for example, a winding structure or a stack structure. As an electrolyte of the battery element 11, for example, an electrolytic solution or a gel electrolyte is used.

(Holder)

Figure 4:
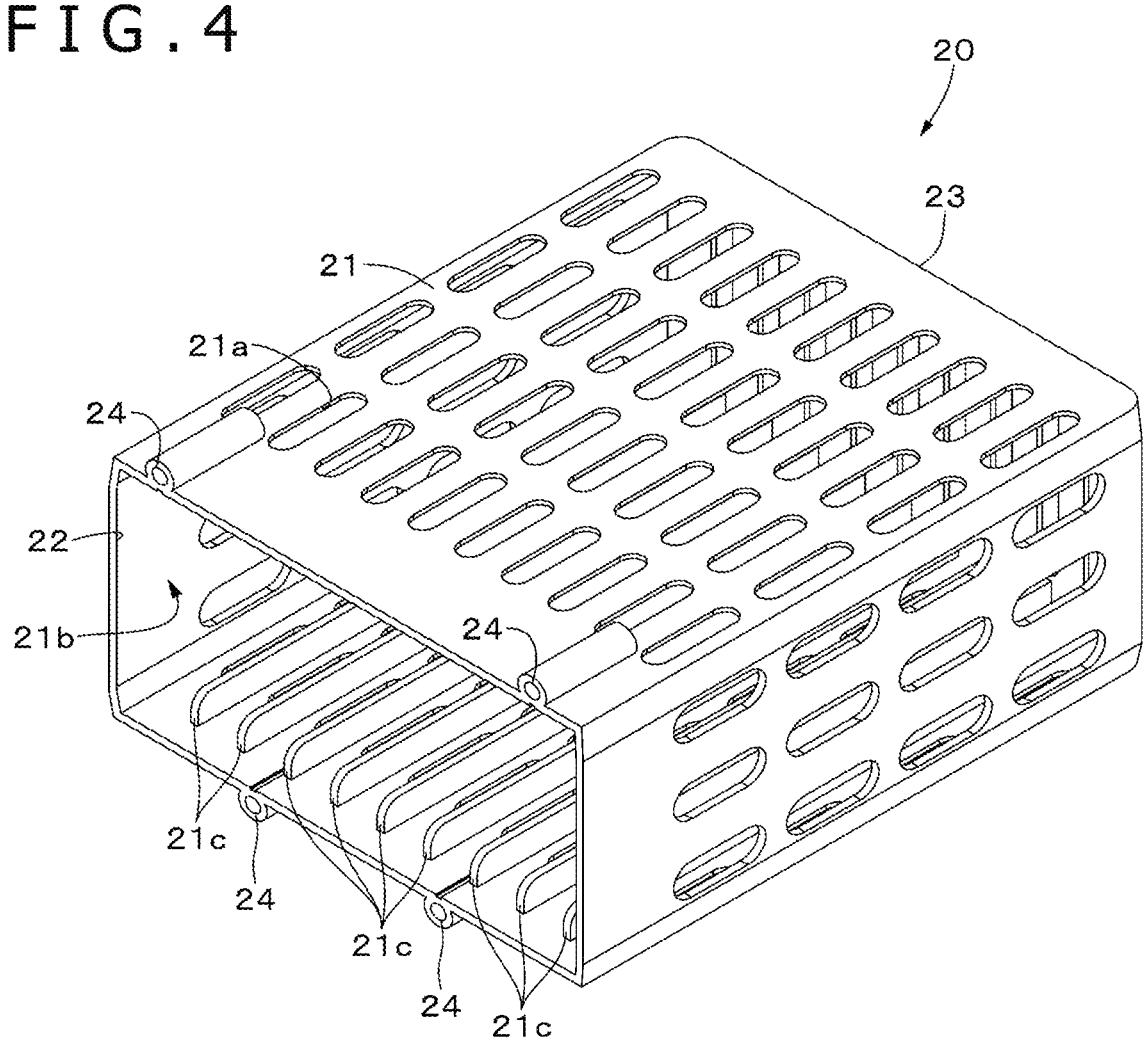
FIG. 4 is a perspective view illustrating the external appearance of a holder.

As illustrated in FIG. 4, the holder 20 is a cubic case that includes a peripheral wall 21, a rectangular opening 22 at one end of the peripheral wall 21, and a rectangular bottom portion 23 at the other end of the peripheral wall 21. The holder 20 retains the batteries 10 in such a manner that the positive lead 13a and the negative lead 13b are positioned toward the opening 22. More specifically, the holder 20 retains the batteries 10 in such a manner that the positive leads 13a and negative leads 13b of neighboring batteries 10 form two columns, and that the positive leads 13a and the negative leads 13b are alternately disposed in the above-mentioned columns. In order to improve the heat dissipation of the battery module 1, a plurality of through-holes 21a are formed in at least either the peripheral wall 21 or the bottom portion 23. A plurality of holes 24 are formed in the circumference of the opening 22 to allow the bolts 71 to be inserted into the holes 24 for fastening purposes.

A plurality of slide guides 21c are disposed on opposing two surfaces of inner circumferential surface 21b of the peripheral wall 21. The slide guides 21c are used to guide the batteries 10 into their storage positions within the holder 20. The slide guides 21c are protrusions extended from the opening 22 toward the bottom portion 23, and are disposed to face the inner circumferential surface 21b of the peripheral wall 21 at predetermined spacing intervals. The holder 20 is capable of retaining the batteries 10 in such a manner that the slide guides 21c cause the principal surfaces of the batteries 10 to face each other and stay apart from each other.

(Cover)

Figure 5:
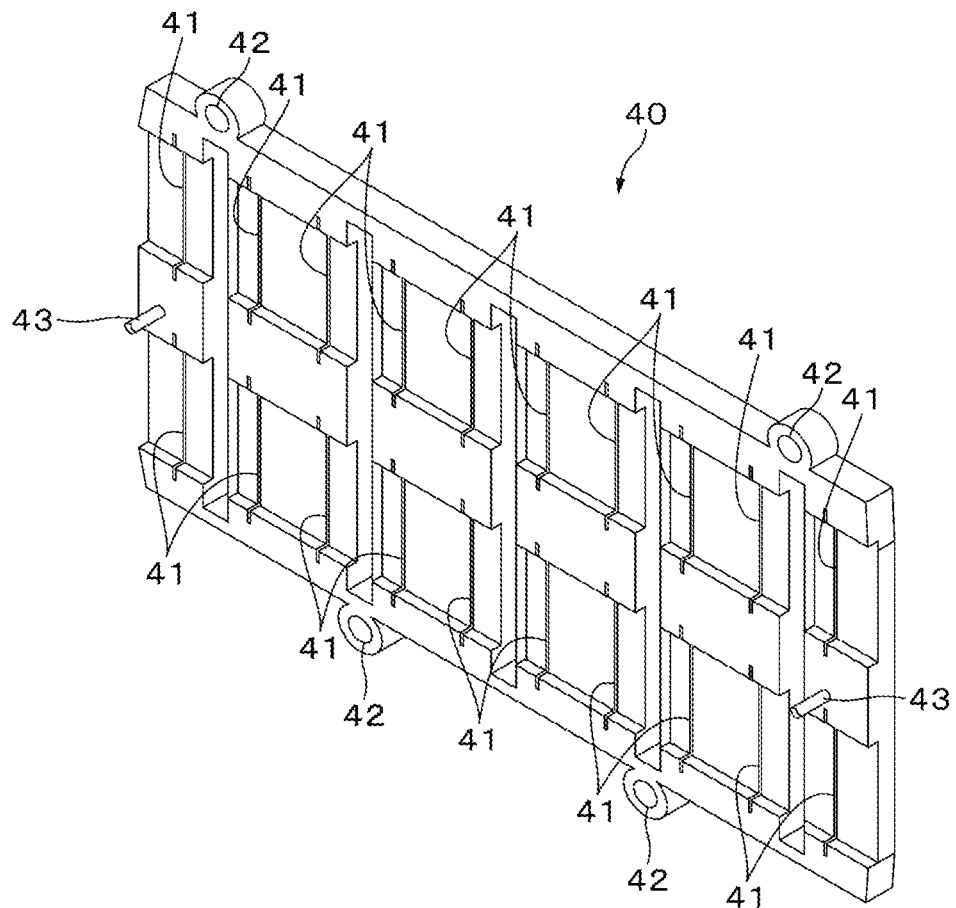
FIG. 5 is a perspective view illustrating the external appearance of a cover.

As illustrated in FIG. 5, the cover 40 is a plate-like member having a rectangular principal surface. A plurality of through-holes 41 are formed in the cover 40 in order to pull out the positive leads 13a and the negative leads 13b. The through-holes 41 are disposed to form two columns. The through-holes 41 are shaped like slits that are extended in a column-to-column direction orthogonal to the direction of the above-mentioned columns. A plurality of through-holes 42 are formed in a peripheral portion of the cover 40 in order to allow the bolts 71 to penetrate. In this document, the principal surfaces of the cover 40, circuit board 60, and front member 70 that face the batteries 10 are referred to as the rear surfaces, and the opposite principal surfaces are referred to as the front surfaces.

(Tabs)

A configuration of the tabs 51 will now be described with reference to FIGS. 6A, 7A, and 7B. The tabs 51 are plate-like connection members for electrically connecting the positive leads 13a and negative leads 13b of the batteries 10. The expression "electrically connecting the positive leads 13a and negative leads 13b of the batteries 10" denotes at least one of three different connection forms, namely, (1) a connection form of electrically connecting the positive leads 13a and negative leads 13b of neighboring batteries 10, (2) a connection form of electrically connecting the positive leads 13a of neighboring batteries 10, and (3) a connection form of electrically connecting the negative leads 13b of neighboring batteries 10. The tabs 51 each include an intermediate portion 51a, junction ends 51b and 51c, and a retention portion 51d. The intermediate portion 51a is disposed between the through-holes 41 that are adjacent to each other in the column direction of the cover 40. The junction ends 51b and 51c are disposed on opposing ends of the intermediate portion 51a. The retention portion 51d is an extended portion that is extended from a side of the intermediate portion 51a. One junction end 51b of the tabs 51 is joined to the positive leads 13a to form a junction 53a. The junction 53a is bent so as to overlap with the intermediate portion 51a that is positioned between the through-holes 41 in the cover 40. The other junction end 51c of the tabs 51 is joined to the negative leads 13b to form a junction 53b. The junction 53b is bent so as to overlap with the intermediate portion 51a that is positioned between the through-holes 41 in the cover 40. The bent junctions 53a and 53b are sandwiched and secured between the cover 40 and the circuit board 60. This improves the vibration resistance of the junctions 53a and 53b.

The retention portion 51d, which is included in the tabs 51, is disposed toward the peripheral portion of the cover 40, and retains a peripheral portion of the circuit board 60 disposed over the cover 40. More specifically, the retention portion 51d is bent inward from the periphery of the front surface, which is positioned opposite a surface of the circuit board 60 that faces the cover 40.

The tabs 51 are disposed between two columns formed by the through-holes 41 in such a manner that a region where the tabs 51 are disposed is adjacent to a region where the tabs 51 are not disposed. The tabs 51 alternately connect the positive leads 13a and the negative leads 13b between the above-mentioned two columns.

Configurations of the tabs 52a and 52b will now be described with reference to FIGS. 6A and 7C. The tab 52a is a plate-like connection member and is electrically connected to the positive lead 13a of a battery 10 that is positioned at one end of a set of the serially connected batteries 10. The tab 52b is a plate-like connection member and is electrically connected to the negative lead 13b of a battery 10 that is positioned at the other end of the set of the serially connected batteries 10.

The tab 52a includes a junction end 54a, an intermediate portion 54b, and a retention portion 54c. The junction end 54a is electrically coupled to the positive lead 13a of the battery 10. The intermediate portion 54b is disposed over the cover 40. The retention portion 54c retains the peripheral portion of the circuit board 60 disposed over the cover 40. The junction end 54a of the tab 52a is joined to the positive lead 13a to form a junction 56a. The junction 56a is bent so as to overlap with the intermediate portion 54b. The tab 52b includes a junction end 55a, an intermediate portion 55b, and a retention portion 55c. The junction end 55a is electrically coupled to the negative lead 13b of the battery 10. The intermediate portion 55b is disposed over the cover 40. The retention portion 55c retains the peripheral portion of the circuit board 60 disposed over the cover 40. The junction end 55a of the tab 52b is joined to the negative lead 13b to form a junction 56b. The junction 56b is bent so as to overlap with the intermediate portion 55b. The bent junctions 56a and 56b are sandwiched and secured between the cover 40 and the circuit board 60. This improves the vibration resistance of the junctions 56a and 56b. The retention portions 54c and 55c, which are included in the tabs 52a and 52b, are bent inward from the periphery of the front surface, which is positioned opposite a surface of the circuit board 60 that faces the cover 40.

(Circuit Board)

As illustrated in FIGS. 6A and 6B, a plurality of connection portions 61 are disposed on two long sides of front peripheries of the circuit board 60. A plurality of retention portions 51d are respectively joined to the connection portions 61. A connection portion 62a is disposed on one short side of the front peripheries of the circuit board 60, and a connection portion 62b is disposed on the other short side. The retention portions 54c and 55c are respectively joined to the connection portions 62a and 62b.

Mounted at a substantial center of the circuit board 60 are, for example, an external positive terminal 63a, an external negative terminal 63b, a communication terminal 64a, and an overcharge/overdischarge signal terminal 64b. The connection portions 62a and 62b are electrically connected to the external positive terminal 63a and the external negative terminal 63b, respectively, through wirings (not depicted). The connection portions 61 are connected to a measurement control section (see FIG. 16) on the circuit board 60 through wirings (not depicted). The measurement control section is connected to the communication terminal 64a and to the overcharge/overdischarge signal terminal 64b. In this document, the external positive terminal 63a, the external negative terminal 63b, the communication terminal 64a, and the overcharge/overdischarge signal terminal 64b may be simply referred to as the terminals 63a, 63b, 64a, and 64b, respectively.

Through-holes 65 are formed in the vicinity of short side ends of the circuit board 60. Resin screws 43 disposed on the front surface of the cover 40 are inserted into the through-holes 65 and melted.

(Buffers)

Figure 8:
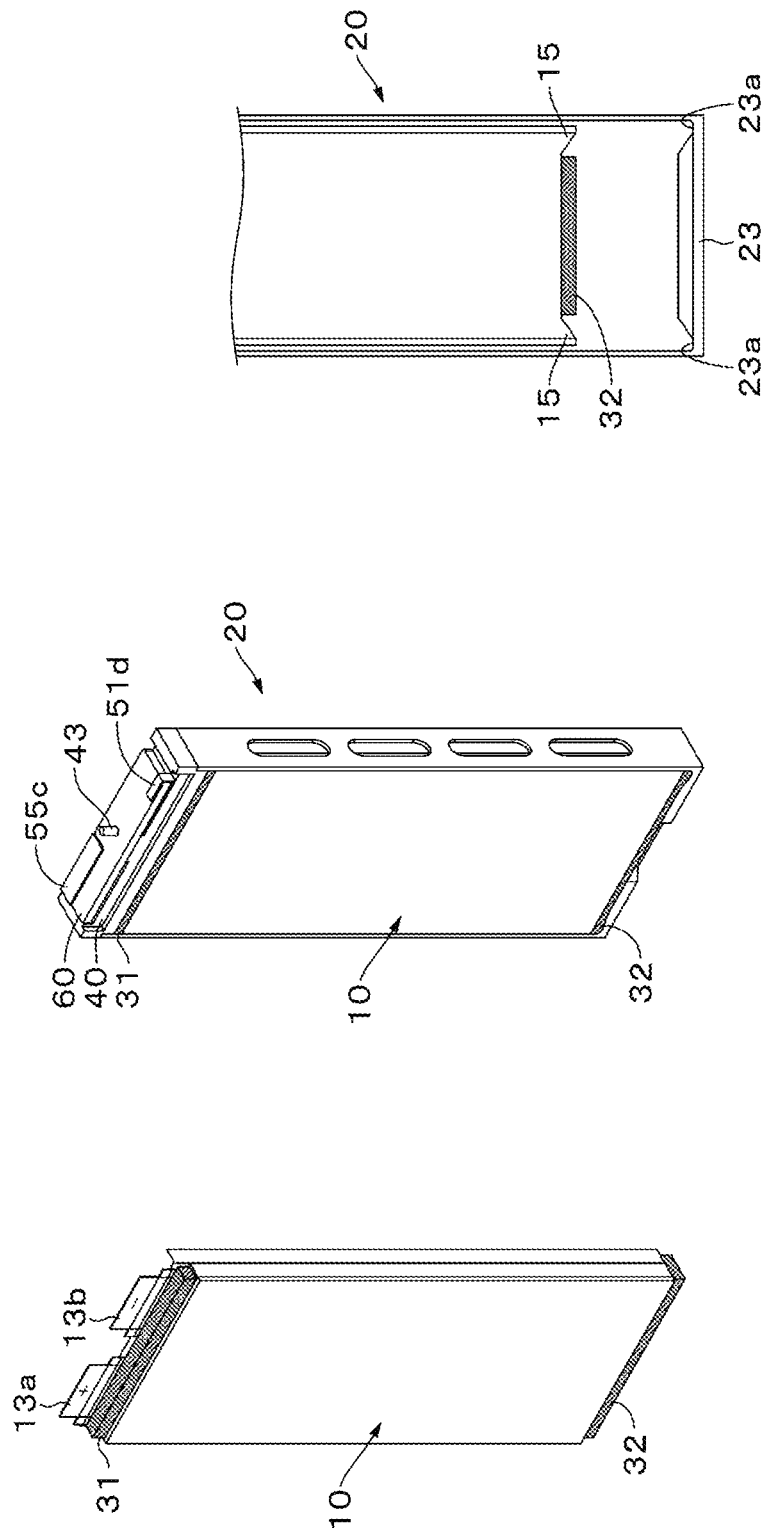
FIG. 8A is a perspective view illustrating the external appearance of a laminate film battery provided with a buffer.
FIG. 8B is a perspective view illustrating a state of the laminate film battery retained by the holder.
FIG. 8C is a schematic diagram illustrating a holder retention mechanism.

As illustrated in FIG. 8A, the buffer 31 is disposed on a top side end face of the battery 10, and the buffer 32 is disposed on a bottom side end face. As illustrated in FIG. 8B, the buffers 31 and 32 are compressed when the battery 10 is secured to a predetermined position in the holder 20. This inhibits the battery 10 from moving when the battery module 1 is vibrated.

The buffer 31 may be disposed toward the cover 40 so as to position the buffer 31 between the battery 10 and the cover 40. Further, the buffer 32 may be disposed toward the bottom portion 23 of the holder 20 so as to position the buffer 32 between the battery 10 and the bottom portion 23 of the holder 20. Furthermore, the buffers may be positioned between the lateral side surface of the cover 40 and the inner circumferential surface 21b of the peripheral wall 21 of the holder 20.

An elastic body formed, for example, of foamed resin or rubber resin may be used as the buffers 31 and 32. The buffers 31 and 32 may contain metal powder, carbon powder, or other conductive particle powder. The reason is that the conductive particle powder improves the thermal conductivity of the buffers and thus improves the heat dissipation of the battery module 1.

When both ends of the bottom side end face of the battery 10 have protrusions 15 as illustrated in FIG. 8C, the bottom portion 23 of the holder 20 preferably has concave portions 23a that fit with the protrusions 15. The reason is that such a configuration improves the impact resistance of the battery module 1. When the above configuration is employed, the buffer 32 is preferably positioned between the protrusions 15.

(Front Member)

Figure 9:
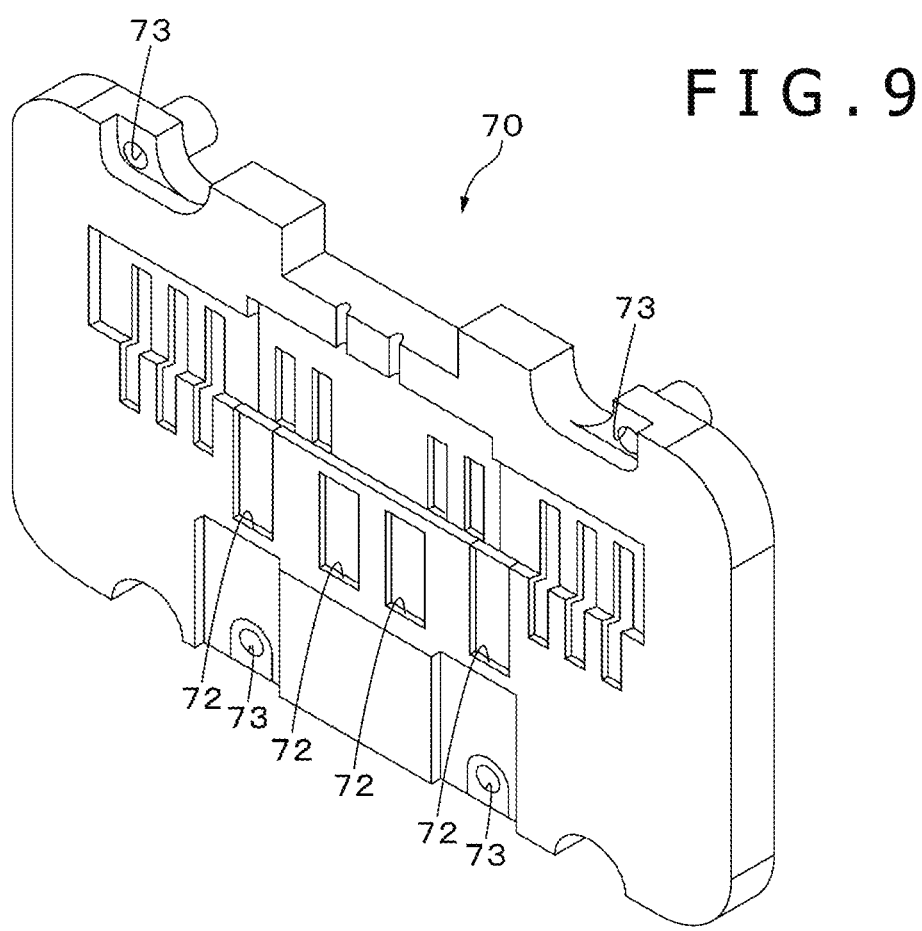
FIG. 9 is a perspective view illustrating the external view of a front member.
Figure 13:
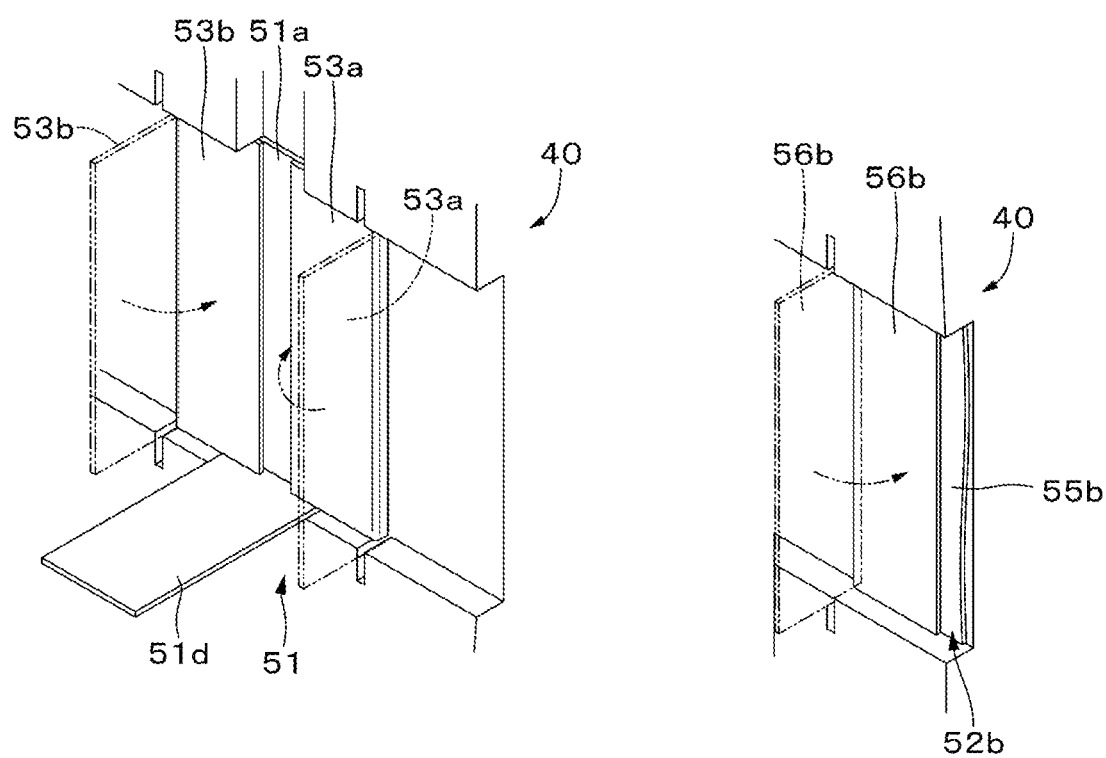
FIGS. 13A and 13B are process charts illustrating the battery module assembly procedure.

As illustrated in FIG. 9, the front member 70 has a plurality of openings 72 at its substantial center. Through these openings 72, the external positive terminal 63a, the external negative terminal 63b, the communication terminal 64a, and the overcharge/overdischarge signal terminal 64b, which are disposed on the circuit board 60, are exposed from the front surface of the battery module 1. A plurality of through-holes 73 are formed in the peripheral portion of the front member 70 in order to allow the bolts 71 to penetrate.

[Battery Module Assembly Procedure]

A procedure for assembling the battery module 1 having the above-described configuration will now be described with reference to FIGS. 10A to 15B.

First of all, as illustrated in FIG. 10A, the batteries 10 are accommodated in their positions guided by the slide guides 21c while positioning the bottom side of the batteries 10 toward the bottom portion 23 of the holder 20 and positioning the top side of the batteries 10 toward the opening 22. In this instance, the orientations of the batteries to be accommodated are adjusted so as to form two columns where the positive leads 13a and the negative leads 13b repeatedly alternate. Next, as illustrated in FIG. 10B, the cover 40 is disposed over the opening 22 in the holder 20 in such a manner that the positive leads 13a and the negative leads 13b are led out from the through-holes 41 in the cover 40.

Next, as illustrated in FIGS. 11A and 11B, the tabs 51 are disposed alternately in a space between the positive leads 13a and the negative leads 13b that form one of the above-mentioned two columns, and the tabs 51 are also disposed alternately in a space between the positive leads 13a and the negative leads 13b that form the other column. In this instance, the tabs 51 are disposed in such a manner that one column space where a tab 51 is disposed is adjacent to the other column space where a tab 51 is not disposed.

Next, as illustrated in FIGS. 11A and 11B, the tab 52a is positioned adjacent to the positive lead 13a at one end of one column and placed on the peripheral portion of the cover 40. Further, the tab 52b is positioned adjacent to the negative lead 13b at the other end of the one column and placed on the peripheral portion of the cover 40.

Next, as illustrated in FIG. 12A, the junction end 51b of a tab 51 is joined to the positive lead 13a, for example, by ultrasonic welding, and the junction end 51c of the tab 51 is joined to the negative lead 13b, for example, by ultrasonic welding. The junctions 53a and 53b are then formed on opposing sides of the intermediate portion 51a. Next, as illustrated in FIG. 12B, the junction end 54a of the tab 52a is joined to the positive lead 13a, for example, by ultrasonic welding, and the junction end 55a of the tab 52b is joined to the negative lead 13b, for example, by ultrasonic welding. The junctions 56a and 56b are then formed on one end of the intermediate portions 54b and 55b, respectively.

Next, as illustrated in FIGS. 7A and 13A, the junctions 53a and 53b are bent toward the intermediate portion 51a. Next, as illustrated in FIGS. 7C and 13B, the junction 56b is bent toward the intermediate portion 55b, and the junction 56a is similarly bent toward the intermediate portion 54b.

Next, as illustrated in FIGS. 14A and 14B, the circuit board 60 is placed in a region surrounded by the retention portions 51d, 54c, and 55c, which are disposed on the peripheral portion of the cover 40. Next, as illustrated in FIG. 15A, the retention portions 51d, 54c, and 55c are bent toward the inside of the circuit board 60, and then the bent portions are matched to the connection portions 61, 62a, and 62b disposed on the peripheral portion of the circuit board 60. Next, the connection portions 61, 62a, and 62b and the retention portions 51d, 54c, and 55c, which are matched to each other, are soldered or otherwise joined together. The peripheral portion of the circuit board 60 is then retained by the retention portions 51d, 54c, and 55c.

Next, as illustrated in FIG. 15B, the external positive terminal 63a, the external negative terminal 63b, the communication terminal 64a, and the overcharge/overdischarge signal terminal 64b are exposed from the openings 72, the front member 70 is disposed over the circuit board 60, and the bolts 71 are allowed to penetrate through the through-holes 73 and 42 and inserted into the holes 24 for fastening purposes. When the above procedure is completed, the battery module 1 is obtained as desired.

[Circuit Configuration]

Figure 16:
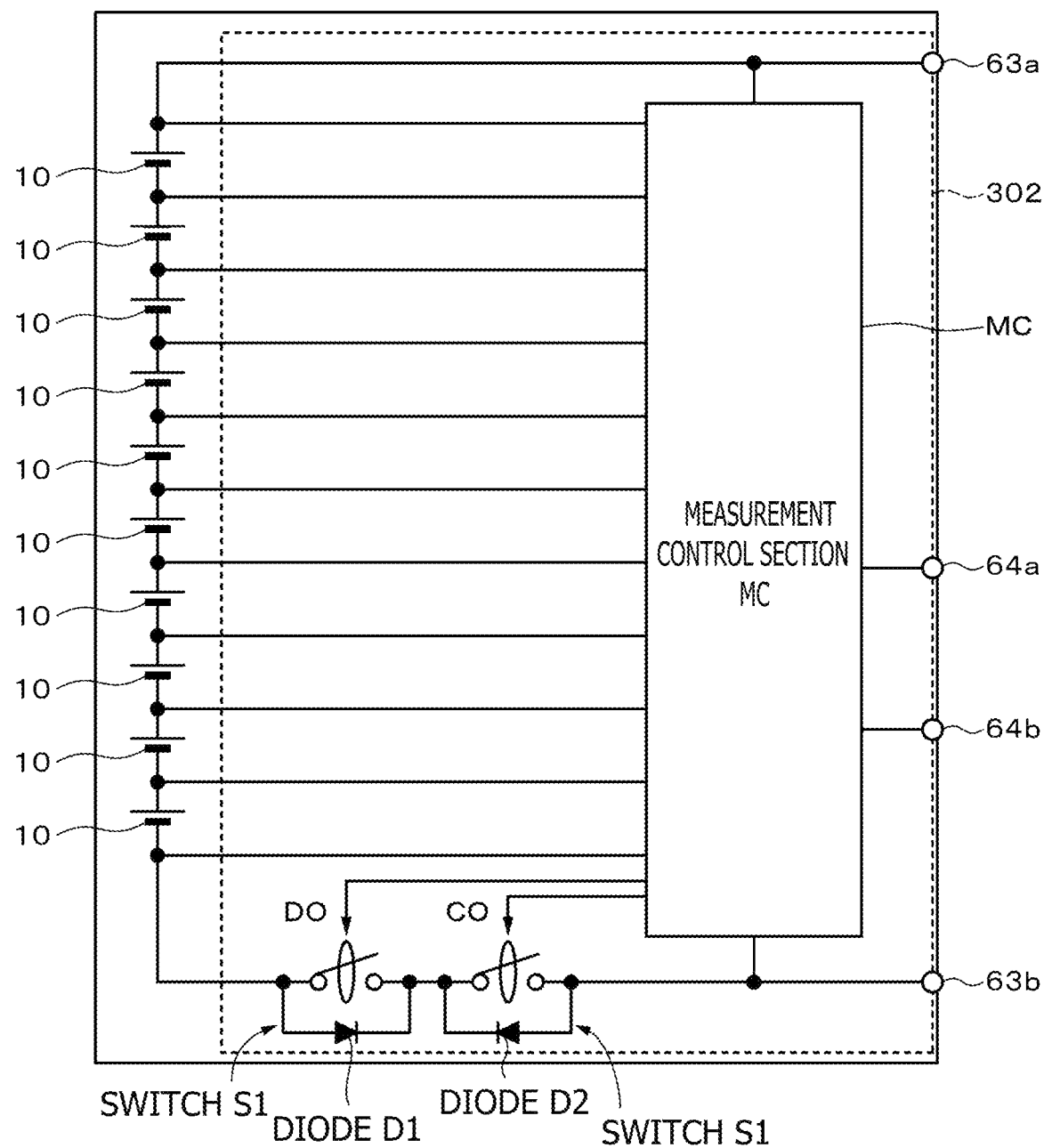
FIG. 16 is a schematic diagram illustrating a circuit configuration of the battery module according to the first embodiment of the present technology.

As illustrated in FIG. 16, the battery module 1 includes the batteries 10, a control circuit block 302, the external positive terminal 63a, the external negative terminal 63b, the communication terminal 64a, and the overcharge/overdischarge signal terminal 64b. The control circuit block 302 is disposed on the circuit board 60.

The external positive terminal 63a and the external negative terminal 63b are connected, for example, to an external control unit in order to let the control unit control the charge/discharge of the battery module 1. The communication terminal 64a and the overcharge/overdischarge signal terminal 64b are similarly connected to the external control unit and used to allow various signals to be exchanged between the battery module 1 and the control unit.

The control circuit block 302 includes the measurement control section MC and switches S1 and S2. The switches S1 and S2 are capable of interrupting a charge current and discharge current for the batteries 10. The switch S1 controls the discharge current, and the switch S2 controls the charge current.

The switch S1 and the switch S2 include a diode D1 and a diode D2, respectively. The diode D1, which is included in the switch S1 for controlling the discharge current, has a forward polarity with respect to the charge current, which flows from the external positive terminal 63a toward the batteries 10, and has a reverse polarity with respect to the discharge current, which flows from the external negative terminal 63b toward the batteries 10. Meanwhile, diode D2, which is included in the switch S2 for controlling the charge current, has a reverse polarity with respect to the charge current and has a forward polarity with respect to the discharge current.

The measurement control section MC monitors the current and voltage of the batteries 10, and transmits to the switches S1 and S2 a control signal for exercising charge/discharge control based on a detected voltage. The measurement control section MC detects the voltage of each battery 10 through the connection portions 61, 62a, and 62b.

[Advantages]

The battery module 1 according to the first embodiment provides improved vibration resistance because it retains the peripheral portion of the circuit board 60 by using the retention portions 51d, 54c, and 55c included in the tabs 51, 52a, and 52b.

Further, the holder 20 retains the batteries 10 in such a manner that they are positioned apart from each other. This improves the heat dissipation of the batteries 10, permits the batteries 10 to supply electric power for a long period of time, and increases the cycle life of the batteries 10. Furthermore, the tabs 51 are used to connect the batteries 10. This makes it easy to manufacture the battery module 1 having various connection configurations such as a serial connection, a parallel connection, and a serial/parallel connection. Moreover, one end of a set of the batteries 10 is secured by the cover 40. This inhibits the batteries 10 from being short-circuited and increases the overall strength of the battery module.

[Modification]

Figure 17:
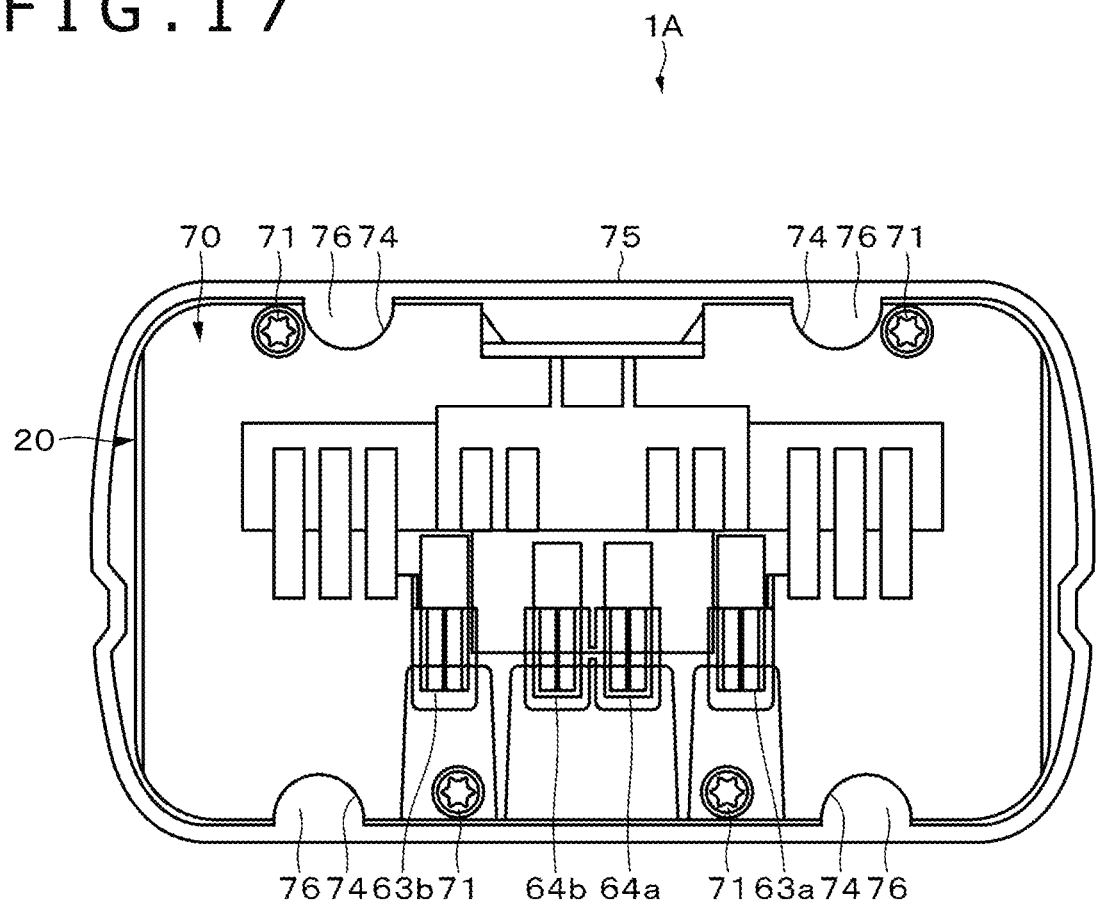
FIG. 17 is a plan view illustrating a configuration of the battery module according to a modification of the first embodiment of the present technology.

As illustrated in FIG. 17, the battery module 1A may additionally include an outer case 75 that surrounds the holder 20. The outer case 75 is a tubular cladding that is open at both ends. A plurality of through-holes are preferably formed in the outer case 75. The reason is that the through-holes improve the heat dissipation of the battery module 1A. A plurality of convex portions 76 are formed on the inner circumference of one open end side of the outer case 75. Meanwhile, a plurality of concave portions 74 are formed on the peripheral portion of the front member 70. When the convex portions 76 are fitted into the concave portions 74, the outer case 75 is retained by the outside of the holder 20 in such a manner that the outer case 75 is positioned apart from the holder 20. This further improves the vibration resistance of the battery module 1A. The outer case 75 is preferably flexible. The reason is that the flexibility of the outer case 75 improves the absorption of impact applied to the battery module 1A. The outer case 75 may be formed, for example, of polymeric resin or metal material. The outer case 75 may be formed by a composite layer that is obtained by joining a metal layer and a polymeric resin layer.

2 Second Embodiment

[Configuration of Battery Module]

As illustrated in FIG. 18A, a battery module 2 according to a second embodiment of the present technology is configured so that a cover 80 is formed of a plurality of cover members 81, which are each provided for each battery 10. The cover members 81 each retain the top side of each battery 10. As illustrated in FIG. 18B, tabs 90 each include a main body portion 91, bent portions 92, and a retention portion 93. The bent portions 92 are formed at substantially right angles to opposing sides of the main body portion 91. The retention portion 93 is extended from a side portion of the main body portion 91. The retention portion 93 retains the peripheral portion of the circuit board 60, which is placed on the cover 80. The tabs 90 are placed on the cover members 81 in such a manner that the cover members 81 are fitted between the bent portions 92.

The positive leads 13a and negative leads 13b of the batteries 10 are led from slit-shaped through-holes in the cover members 81 toward the front side of the cover members 81. Alternatively, the positive leads 13a and the negative leads 13b may be led from a gap between neighboring cover members 81 toward the front side of the cover members 81. The leading ends of the positive leads 13a and negative leads 13b, which are led out, are bent, and the bent portions are soldered or otherwise joined to the main body portions 91 of the tabs 90. In all respects other than those described above, the battery module 2 is configured the same as the battery module according to the first embodiment.

[Advantages]

The battery module 2 according to the second embodiment uses a plurality of cover members 81. This makes it unnecessary to perform a troublesome process of pulling out the positive leads 13a and negative leads 13b of the batteries 10 from the through-holes 41 in the cover 40 as described in conjunction with the first embodiment. As a result, increased productivity is provided.

3 Third Embodiment

[Overview]

A case where the terminals 63a, 63b, 64a, and 64b of the battery module 1 according to the first embodiment are to be fitted into terminals 703a, 703b, 704a, and 704b of an apparatus 701 as illustrated in FIG. 25A will now be described. The apparatus 701 is, for example, a power tool main body or a charger.

As illustrated in FIG. 25B, if the positions of the terminals 63a, 63b, 64a, and 64b of the battery module 1 respectively match the positions of the terminals 703a, 703b, 704a, and 704b of the apparatus 701, the terminals 63a, 63b, 64a, and 64b of the battery module 1 can be respectively fitted into the terminals 703a, 703b, 704a, and 704b of the apparatus 701.

However, as illustrated in FIG. 25C, if the positions of the terminals 63a, 63b, 64a, and 64b of the battery module 1 do not respectively match the positions of the terminals 703a, 703b, 704a, and 704b of the apparatus 701, the terminals 63a, 63b, 64a, and 64b of the battery module 1 might not be respectively fitted into the terminals 703a, 703b, 704a, and 704b of the apparatus 701.

Figure 26:
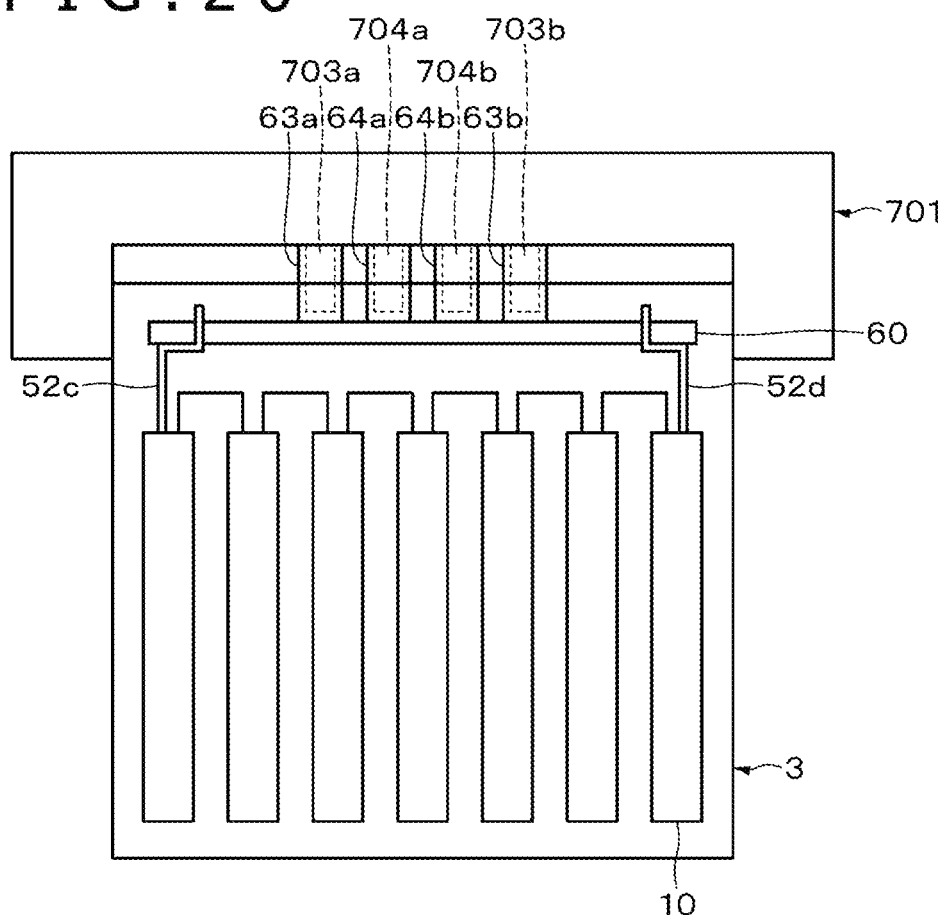
FIG. 26 is a schematic diagram illustrating an overview of the battery module according to a third embodiment of the present technology.

To address the above fitting problems, a battery module 3 according to a third embodiment employs elastic tabs 52c and 52d to suspend opposing ends of the circuit board 60 as illustrated in FIG. 26 so that the circuit board 60 is movable in a lateral direction (horizontal direction).

[Configuration of Battery Module]

As illustrated in FIG. 27, the battery module 3 according to the third embodiment is configured so that the tab (first connection member) 52c is electrically connected to the positive lead 13a of a battery 10 at one end of a set of the batteries 10 retained by the holder 20, and that the tab (second connection member) 52d is electrically connected to the negative lead 13b of a battery 10 at the other end of the set of the batteries 10 retained by the holder 20.

Further, the tabs 52c and 52d retain the opposing ends of the circuit board 60 in such a manner as to suspend them above the cover 40, and thus allow the circuit board 60 to move in the lateral direction (horizontal direction). One end of the tab 52c is fitted into an elongated hole 62c in one end portion of the circuit board 60 to retain the one end portion of the circuit board 60, and is electrically connected to the connection portion 62a, for example, by soldering. One end of the tab 52d is fitted into an elongated hole 62d in the other end portion of the circuit board 60 to retain the other end portion of the circuit board 60, and is electrically connected to the connection portion 62b, for example, by soldering. The tabs 52c and 52d are electrically conductive, elastic connection members, and more specifically, leaf spring members.

A tab 51m is different from the tabs 51 according to the first embodiment in that the former is used in place of the retention portion 51d, is not bent, and is provided with an extended portion 51n that does not retain the circuit board 60. The extended portion 51n is electrically connected to the connection portion 61 with a lead wire or other linear connection member 51w.

In all respects other than those described above, the battery module 3 according to the third embodiment is the same as the battery module 1 according to the first embodiment.

[Advantages]

In the battery module 3 according to the third embodiment, the tabs 52c and 52d retain the opposing ends of the circuit board 60 in such a manner that the circuit board 60 is movable in the lateral direction (horizontal direction). Therefore, even if the positions of the terminals 63a, 63b, 64a, and 64b of the battery module 3 do not respectively match the positions of the terminals 703a, 703b, 704a, and 704b of the apparatus 701, the terminals 63a, 63b, 64a, and 64b of the battery module 3 can be respectively fitted into the terminals 703a, 703b, 704a, and 704b of the apparatus 701 (see FIG. 26).

4 Fourth Embodiment

[Configuration of Battery Module]

Figure 28:
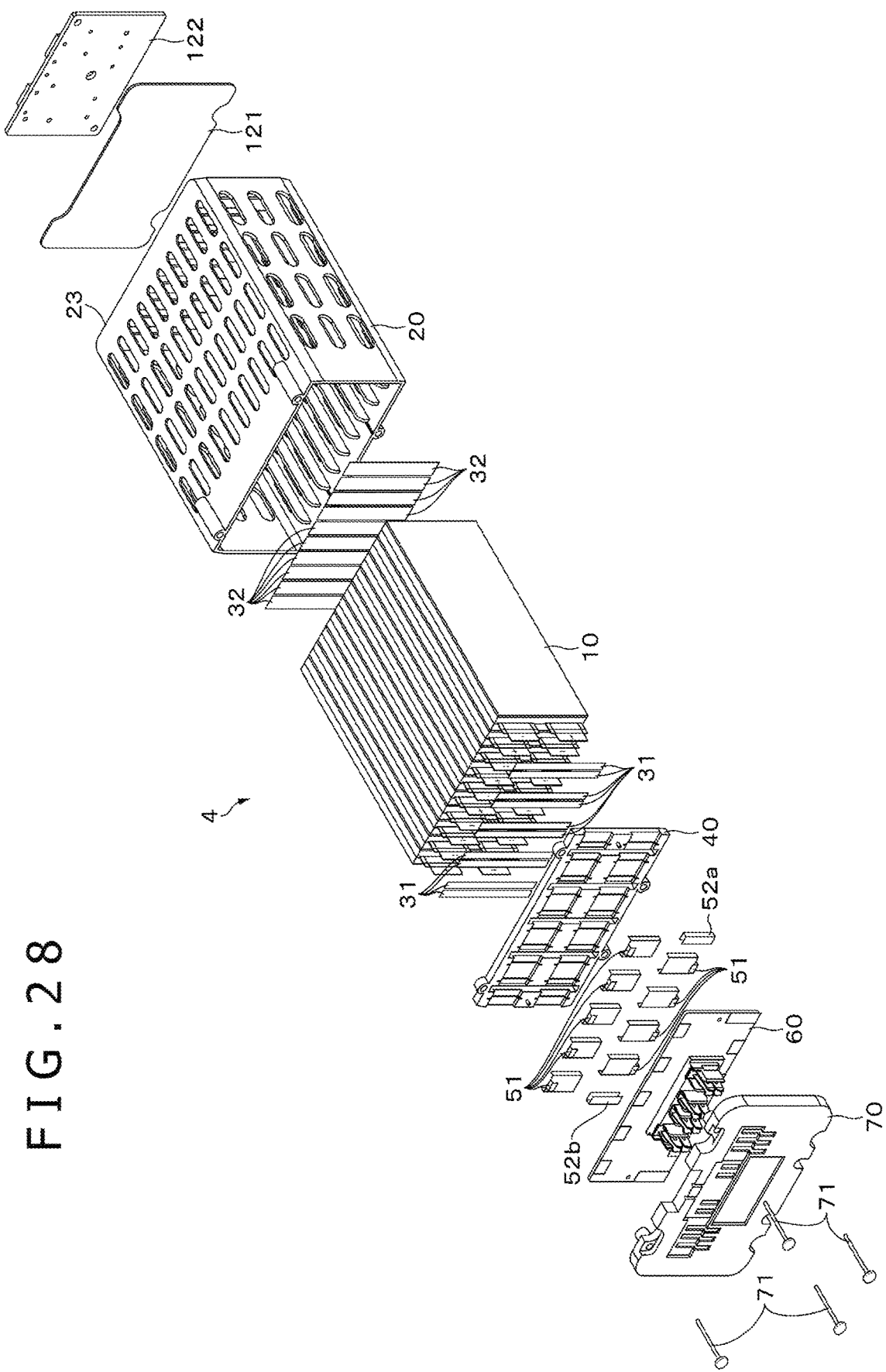
FIG. 28 is an exploded perspective view illustrating a configuration of the battery module according to a fourth embodiment of the present technology.

As illustrated in FIG. 28, a battery module 4 according to a fourth embodiment of the present technology additionally includes an insulating plate 121 and a main circuit board 122. The insulating plate 121 is disposed on an outside surface of the bottom portion 23 of the holder 20. The main circuit board 122 is disposed on the insulating plate 121. Elements of the fourth embodiment that are identical with the corresponding elements of the first embodiment are designated by the same reference numerals as their corresponding elements and will not be redundantly described.

The insulating plate 121 and the main circuit board 122 are fastened to the outside surface of the bottom portion 23 with bolts or other fasteners (not depicted). The main circuit board 122 is electrically connected to the circuit board 60 with lead wires or other linear connection members (not depicted). In the fourth embodiment, the circuit board 60 includes, for example, a switch capable of interrupting the charge current and discharge current for the batteries 10, and the main circuit board 122 includes, for example, the measurement control section MC.

5 Fifth Embodiment

[Configuration of Battery Module]

Figure 29:
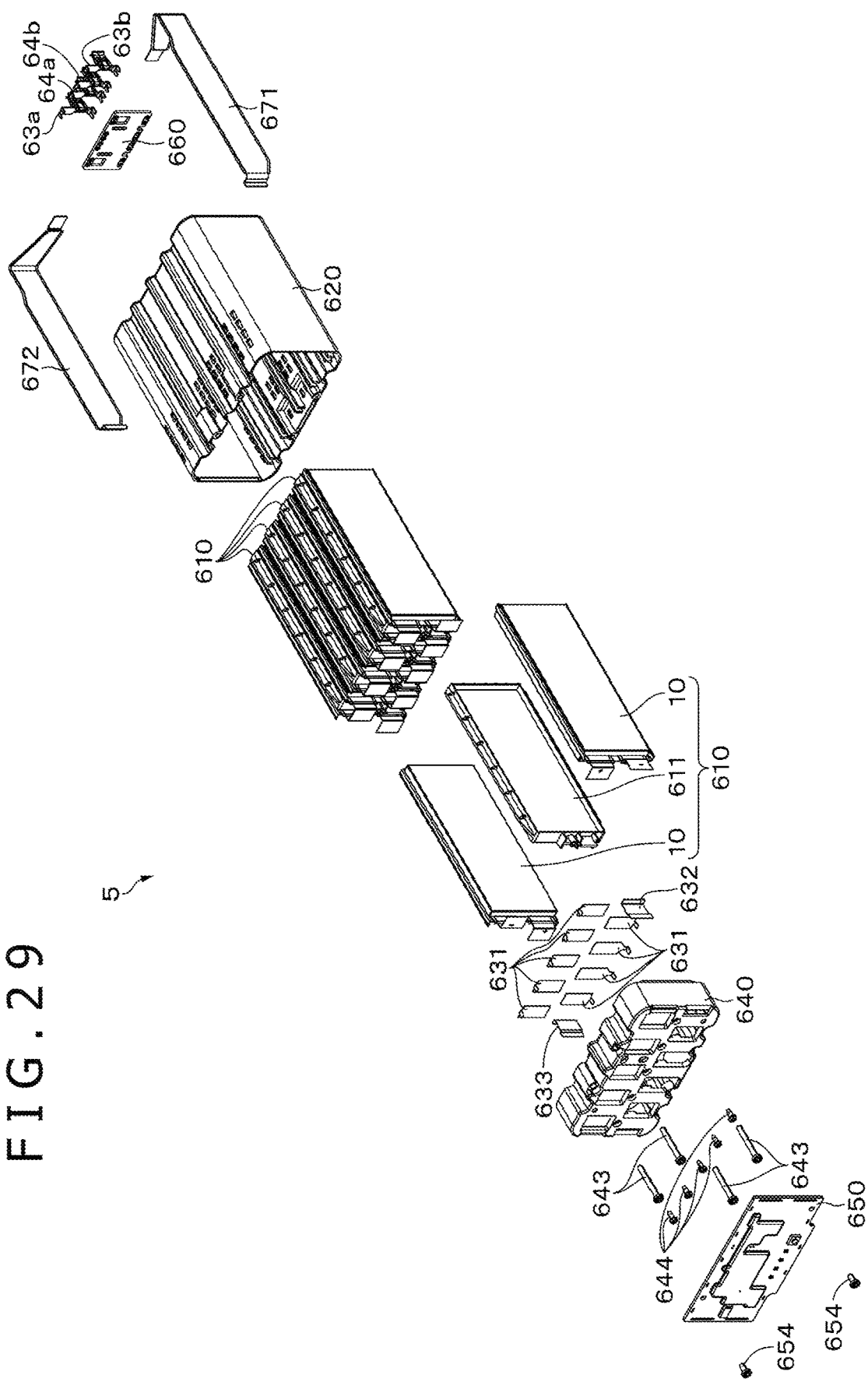
FIG. 29 is an exploded perspective view illustrating a configuration of the battery module according to a fifth embodiment of the present technology.
Figure 30:
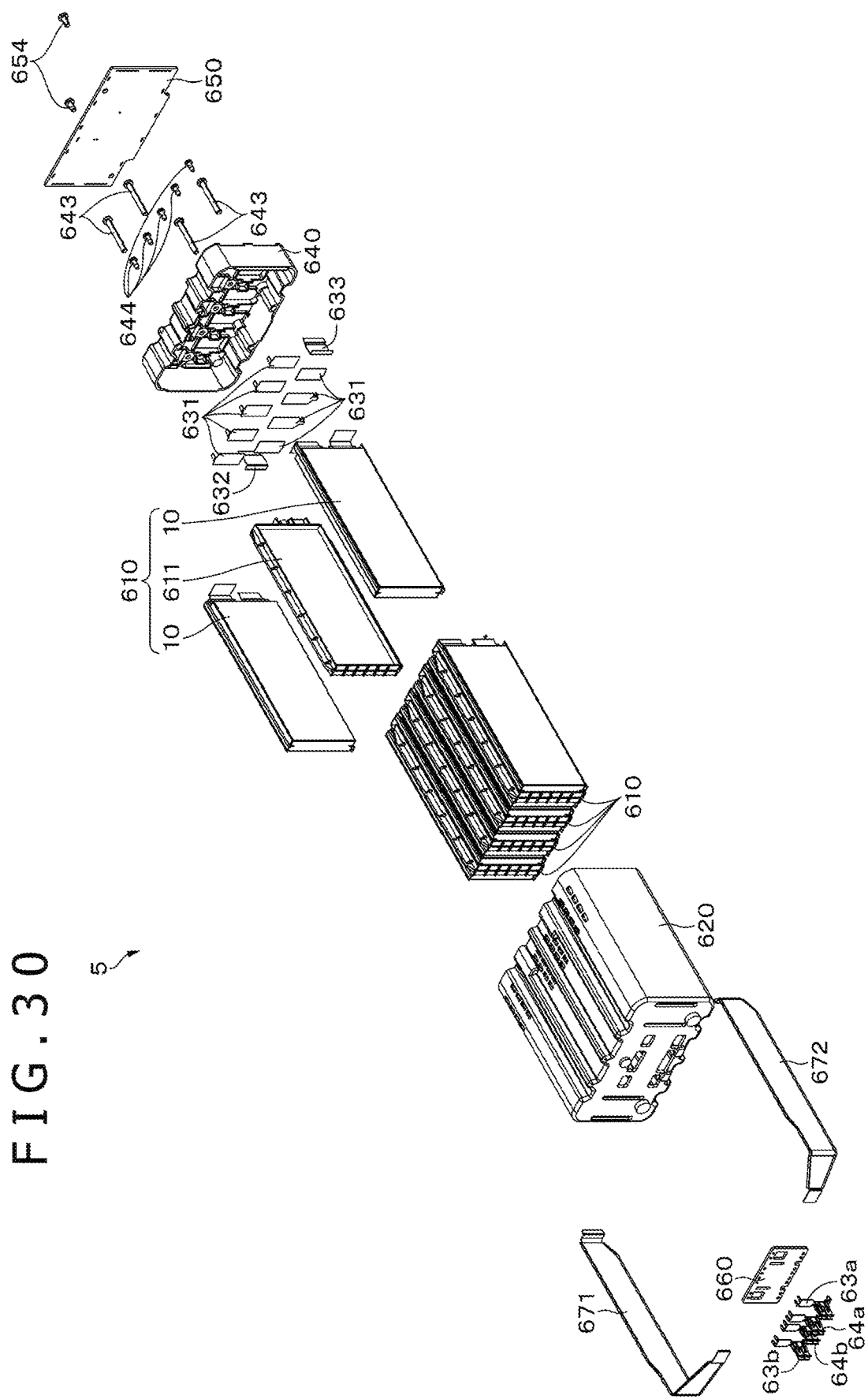
FIG. 30 is an exploded perspective view illustrating the battery module as viewed in a direction opposite to FIG. 29.

As illustrated in FIGS. 29 and 30, a battery module 5 according to a fifth embodiment of the present technology includes a plurality of battery units 610, a holder 620, a cover 640, a main circuit board 650, an input/output terminal circuit board 660, and a pair of busbars 671 and 672. The holder 620 accommodates and retains the battery units 610. The cover 640 is disposed at one end of the holder 620. The main circuit board 650 is disposed on the cover 640. The input/output terminal circuit board 660 is disposed at the other end of the holder 620. The pair of busbars 671 and 672 electrically connect the main circuit board 650 and the input/output terminal circuit board 660.

A plurality of tabs 631, 632, and 633 are disposed at one end of a set of the battery units 610. The cover 640 is fastened to the holder 620 with a plurality of bolts 643 serving as fasteners, and is fastened to one end of the set of the battery units 610 with a plurality of screws 644 serving as fasteners.

The battery units 610, the holder 620, the cover 640, the tabs 631, 632, and 633, the main circuit board 650, the input/output terminal circuit board 660, and the busbars 671 and 672 will now be described in sequence. Elements of the fifth embodiment that are identical with the corresponding elements of the first embodiment are designated by the same reference numerals as their corresponding elements and will not be redundantly described.

(Battery Units)

Figure 31:
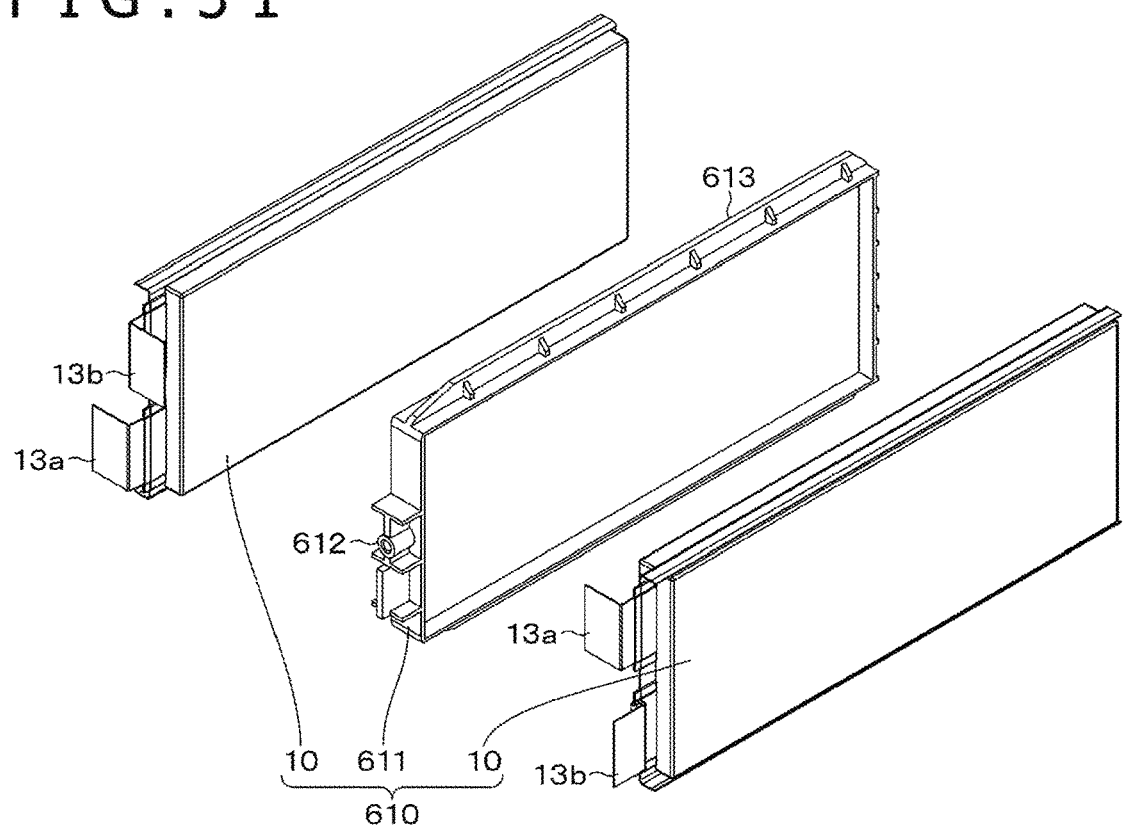
FIG. 31 is an exploded perspective view illustrating a configuration of a battery unit.

As illustrated in FIG. 31, the battery units 610 each include a pair of batteries 10 and a bracket 611. The bracket 611 retains the pair of batteries. The bracket 611, which is a plate-like retention member, retains the pair of batteries 10 using its opposing principal surfaces in such a manner that leads having different polarities (i.e., a positive lead 13a and a negative lead 13b) are positioned adjacent to each other via the bracket 611.

An adhesive sheet or other pasting layer (not depicted) is disposed between the batteries 10 and the principal surfaces of the bracket 611. The batteries 10 are retained by the principal surfaces of the bracket 611 via such an adhesive layer. The bracket 611 has a hole 612 and a protrusion 613. The hole 612 is formed in one end facing the cover 640 and used to accept a screw 644 for fastening purposes. The protrusion 613 is disposed along a lateral surface.

(Holder)

Figure 32:
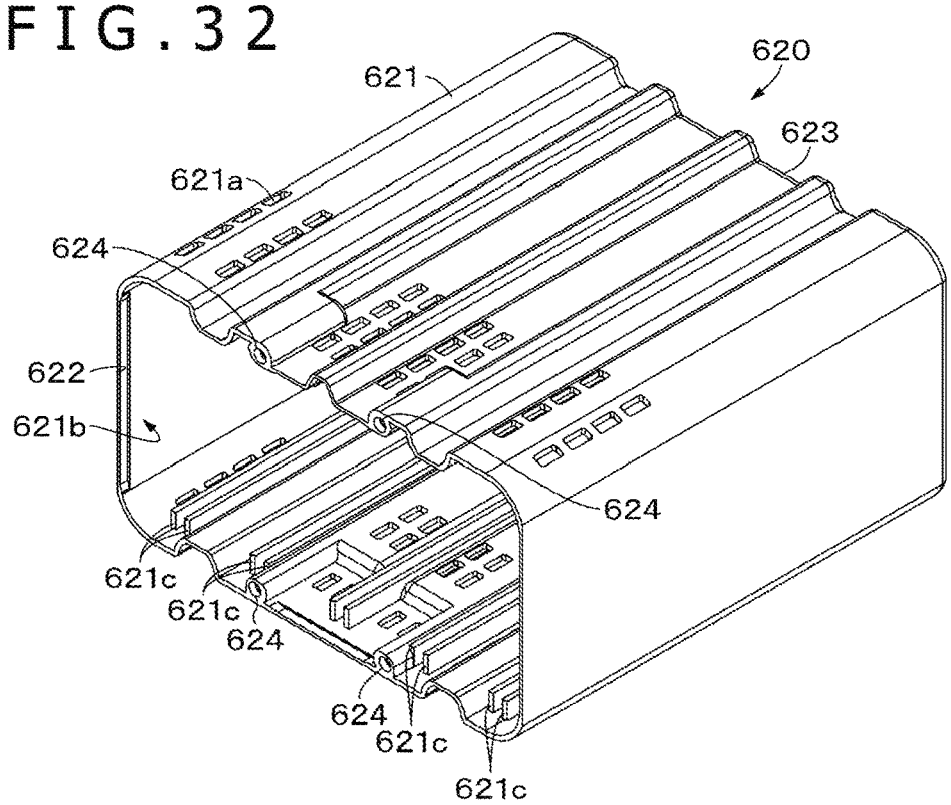
FIG. 32 is a perspective view illustrating the external appearance of the holder.

As illustrated in FIG. 32, the holder 620 is a substantially cubic case that includes a peripheral wall 621, an opening 622, and a bottom portion 623. The opening 622 is substantially rectangular in shape and disposed at one end of the peripheral wall 621. The bottom portion 623 is substantially rectangular in shape and disposed at the other end of the peripheral wall 621. The holder 620 retains the battery units 610 in such a manner that the positive leads 13a and the negative leads 13b are positioned toward the opening 622. More specifically, the holder 620 retains the battery units 610 in such a manner that the positive leads 13a and negative leads 13b of neighboring batteries 10 form two columns, and that the positive leads 13a and the negative leads 13b are alternately disposed in the above-mentioned columns. In order to improve the heat dissipation of the battery module 5, a plurality of through-holes 621a are formed in at least either the peripheral wall 621 or the bottom portion 623. A plurality of holes 624 are formed in the circumference of the opening 622 to allow the bolts 643 to be inserted into the holes 624 for fastening purposes.

A plurality of slide guides 621c are disposed on opposing two faces of an inner circumferential surface 621b. The slide guides 621c are used to guide the battery units 610 into their storage positions within the holder 620. The slide guides 621c are positioned to face the inner circumferential surface 621b. The slide guides 621c are formed of a pair of protrusions extended from the opening 622 toward the bottom portion 623. When the protrusion 613 of the bracket 611 is pushed into a space between the pair of protrusions of the slide guides 621c, the battery units 610 are guided into their storage positions within the holder 620. The holder 620 is capable of retaining the batteries 10 in such a manner that the slide guides 621c cause the principal surfaces of the batteries 10 retained by battery units 610 to face each other and stay apart from each other.

(Cover)

Figure 33:
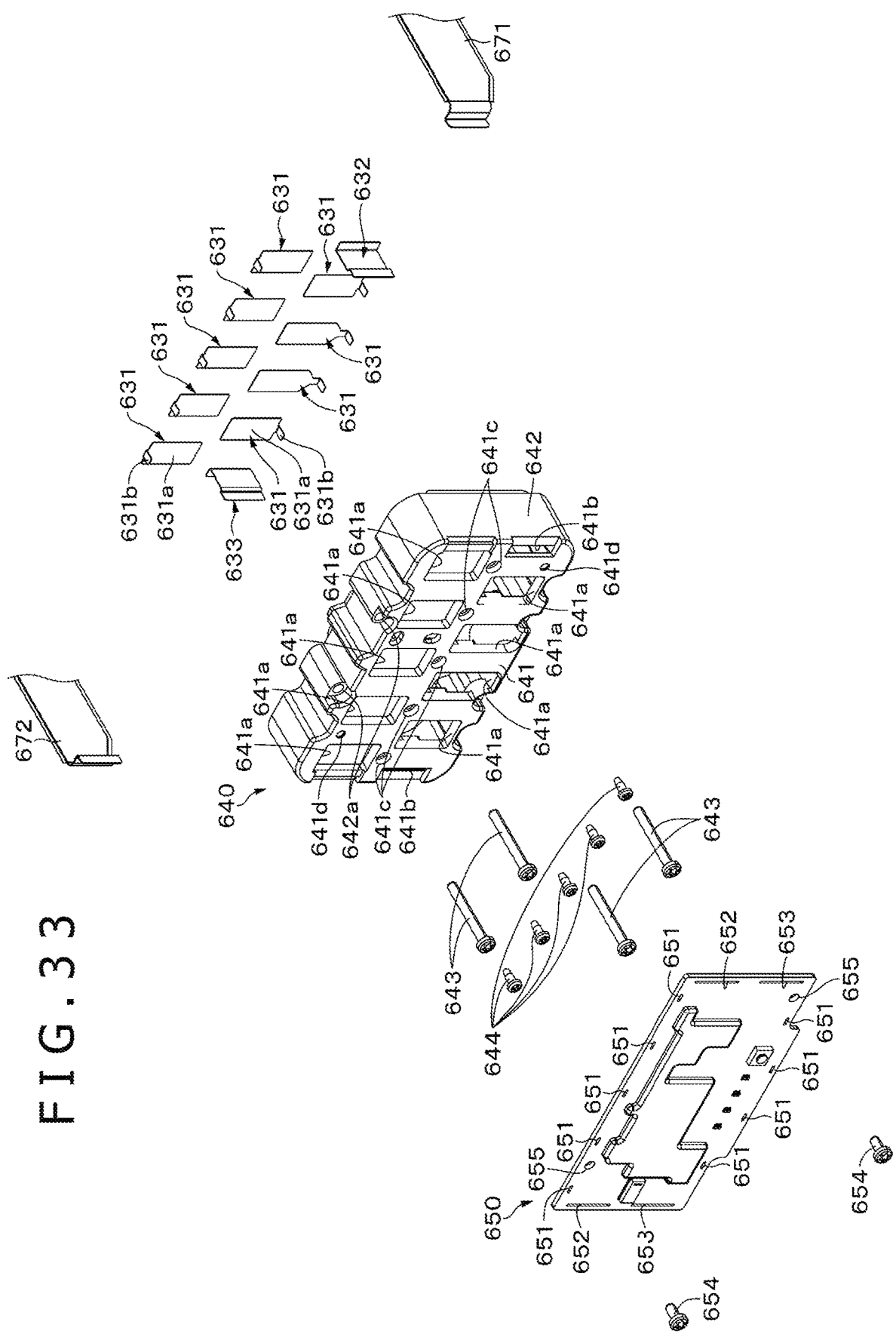
FIG. 33 is an exploded perspective view illustrating an arrangement of the tab, the cover, and a main circuit board.

As illustrated in FIG. 33, the cover 640 includes a bottom portion 641 and a wall 642. The wall 642 is disposed on the periphery of the bottom portion 641. The bottom portion 641 has a plurality of through-holes 641a for exposing the tabs 631 and two through-holes 641b through which the tabs 632 and 633 pass. The through-holes 641a are disposed to form two columns. The through-holes 641b are disposed in the opposing ends of one column. The bottom portion 641 also has a plurality of holes 641c through which a plurality of screws 644 are inserted.

The leading end of the wall 642 can be fitted into the opening 622 in the holder 620. The wall 642 has a plurality of through-holes 642a through which the bolts 643 are inserted. In this document, the principal surfaces of the cover 640, main circuit board 650, and input/output terminal circuit board 660 that face the holder 620 are referred to as the rear surfaces, and the opposite principal surfaces are referred to as the front surfaces.

(Tabs)

Figure 34:
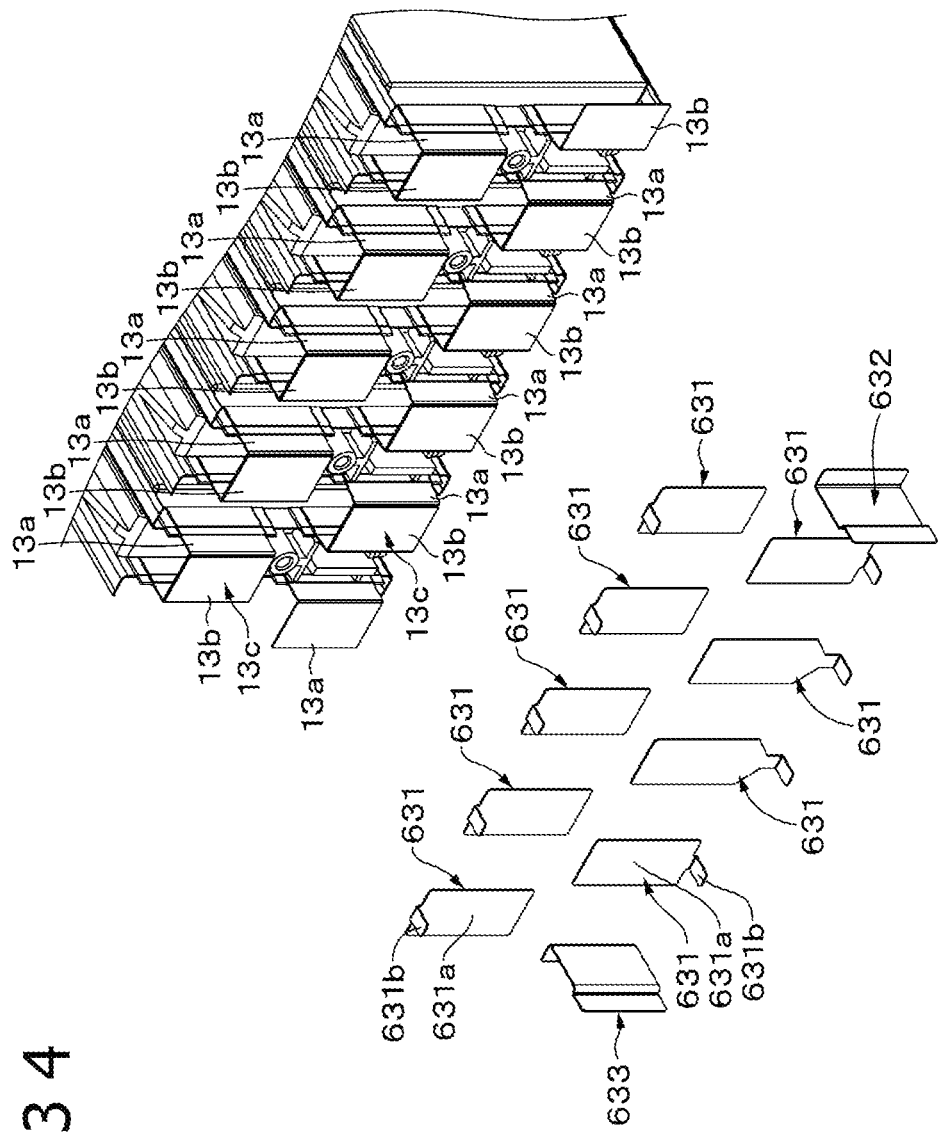
FIG. 34 is an exploded perspective view illustrating the connection between a positive lead, a negative lead, and the tab.

As illustrated in FIG. 34, a connection portion 13c is formed between two columns formed of the positive leads 13a and the negative leads 13b in such a manner that the positive leads 13a and negative leads 13b of neighboring batteries 10 are alternately connected. The connection portion 13c is formed by joining the leading ends of the positive leads 13a and negative leads 13b in an overlapping manner. The tabs 631 for voltage detection are plate-like connection members electrically connected to the connection portion 13c. More specifically, the tabs 631 each include a connection portion 631a and a retention portion 631b. The connection portion 631a is electrically connected to the connection portion 13c. The retention portion 631b is disposed at one end of the connection portion 631a and raised with respect to the connection portion 631a. As illustrated in FIG. 33, the tabs 631 are exposed from the through-holes 641a in such a manner that the retention portion 631b is disposed toward the periphery of the bottom portion 641.

The tab 632 is a plate-like connection member and is electrically connected to the negative lead 13b of a battery 10 that is positioned at one end of a set of batteries 10 retained by the holder 620. The tab 633 is a plate-like connection member and is electrically connected to the positive lead 13a of a battery 10 that is positioned at the other end of the set of batteries 10 retained by the cover 640.

In the example of FIG. 34, the negative lead 13b is positioned above the positive lead 13a in the connection portion 13c, and the negative lead 13b is connected to the tab 631. However, an alternative is to position the positive lead 13a above the negative lead 13b in the connection portion 13c and connect the positive lead 13a to the tab 631. Another alternative is to let the tab 631 electrically connect the positive lead 13a and the negative lead 13b instead of directly connecting the positive lead 13a and the negative lead 13b in an overlapping manner. Further, although FIG. 34 indicates that the batteries 10 are serially connected by connecting the positive leads 13a and the negative leads 13b, the connection of the batteries 10 is not limited to such a connection configuration. Alternatively, the batteries 10 may be connected in a parallel manner or in a serial/parallel manner.

(Main Circuit Board)

As illustrated in FIG. 33, the main circuit board 650 is substantially rectangular in shape. The main circuit board 650 has a plurality of holes 651 that are formed along two long sides. A plurality of retention portions 631b are fitted into these holes 651 from the rear surface of the main circuit board 650 and electrically connected to the main circuit board 650. The retention portions 631b fitted into the holes 651 may be soldered or otherwise secured to the main circuit board 650.

The main circuit board 650 has holes 652 and 653 along two short sides. One end each of the busbars 671 and 672 is fitted into the opposing holes 652 from the rear surface of the main circuit board 650 and electrically connected to the main circuit board 650. One end each of the busbars 671 and 672 fitted into the holes 652 may be soldered or otherwise secured to the main circuit board 650.

One end each of the tabs 632 and 633 is fitted into the opposing holes 653 from the rear surface of the main circuit board 650 and electrically connected to the main circuit board 650. One end each of the tabs 632 and 633 fitted into the holes 653 may be soldered or otherwise secured to the main circuit board 650. By way of the main circuit board 650, the tab 632 is electrically connected to the busbar 671 and the tab 633 is electrically connected to the busbar 672.

When, as described above, the retention portions 631b are respectively fitted into the holes 651, and one end each of the tabs 632 and 633 is respectively fitted into the holes 653, the peripheral portion of the main circuit board 650 is retained by the retention portions 631b and the tabs 632 and 633.

The main circuit board 650 includes the control circuit block 302 depicted in FIG. 16. The control circuit block 302 is electrically connected to the tabs 631, 632 and 633 and to the busbars 671 and 672. The measurement control section MC included in the control circuit block 302 detects the voltage of each battery 10 via the tabs 631, 632 and 633.

(Input/Output Terminal Circuit Board)

As illustrated in FIG. 35, the input/output terminal circuit board 660 is substantially rectangular in shape. For example, the terminals 63a, 63b, 64a, and 64b are mounted on the surface of the input/output terminal circuit board 660. Further, two connection portions (not depicted) are disposed on the surface of the input/output terminal circuit board 660 in order to electrically connect the busbars 671 and 672. These connection portions are disposed toward the opposing short sides of the input/output terminal circuit board 660. By way of the input/output terminal circuit board 660, the busbar 671 is electrically connected to the terminal 63b and the busbar 672 is electrically connected to the terminal 63a. Further, the terminals 64a and 64b of the input/output terminal circuit board 660 are electrically connected to the control circuit block 302 of the main circuit board 650 with lead wires or other linear connection members (not depicted).

(Busbars)

The busbars 671 and 672 retain the opposing ends of the input/output terminal circuit board 660 in such a manner as to suspend them above the bottom portion 623 of the holder 620, and thus allow the input/output terminal circuit board 660 to move in the lateral direction (horizontal direction). The busbars 671 and 672 are disposed along a lateral surface of the battery module 5. The busbar 671 is a connection member that electrically connects the negative terminals of the main circuit board 650 and input/output terminal circuit board 660. The busbar 672 is a connection member that electrically connects the positive terminals of the main circuit board 650 and input/output terminal circuit board 660.

The configuration described above is such that the busbars 671 and 672 retain the opposing ends of the input/output terminal circuit board 660. However, the portions of the input/output terminal circuit board 660 that are to be retained by the busbars 671 and 672 are not limited to the above. Any portions of the input/output terminal circuit board 660 may be retained by the busbars 671 and 672 as far as the input/output terminal circuit board 660 is movable in the lateral direction (horizontal direction). For example, central or other inner portions of the input/output terminal circuit board 660 may be retained by the busbars 671 and 672.

[Advantages]

In the battery module 5 according to the fifth embodiment, the busbars 671 and 672 retain the input/output terminal circuit board 660 in such a manner that the input/output terminal circuit board 660 is movable in the lateral direction (horizontal direction). Therefore, even if the positions of the terminals 63a, 63b, 64a, and 64b of the battery module 5 do not respectively match the positions of the terminals 703a, 703b, 704a, and 704b of the apparatus 701, the terminals 63a, 63b, 64a, and 64b of the battery module 5 can be respectively fitted into the terminals 703a, 703b, 704a, and 704b of the apparatus 701.

Further, in the battery module 5 according to the fifth embodiment, the peripheral portion of the main circuit board 650 is retained by the retention portion 631b, which is included in the tab 631. This improves the vibration resistance of the battery module 5. Furthermore, the holder 620 retains the battery units 610 in such a manner that they are positioned apart from each other. This improves the heat dissipation of the battery units 610, permits the battery units 610 to supply electric power for a long period of time, and increases the cycle life of the battery units 610.

[Modification]

The battery module 5 according to the fifth embodiment may additionally include the outer case 75 depicted in FIG. 17.

The configuration of the first embodiment may be modified by removing the terminals 63a, 63b, 64a, and 64b from the circuit board 60, additionally including the busbars 671 and 672 and the input/output terminal circuit board 660, and electrically connecting the circuit board 60 to the input/output terminal circuit board 660 with the busbars 671 and 672. Even if the positions of the terminals 63a, 63b, 64a, and 64b of the battery module do not respectively match the positions of the terminals 703a, 703b, 704a, and 704b of the apparatus 701, the above-mentioned modified configuration permits the terminals 63a, 63b, 64a, and 64b of the battery module to be respectively fitted into the terminals 703*a*, 703*b*, 704*a*, and 704*b* of the apparatus 701.

6 Sixth Embodiment

A composite module according to a sixth embodiment of the present technology includes a plurality of pieces of the battery module according to the first or second embodiment or their modification. The battery modules are electrically connected in a serial manner, in a parallel manner, or in a serial/parallel manner. The composite module may include a plurality of pieces of the battery module according to any one of the third to fifth embodiments and their modifications instead of the battery module according to the first or second embodiment or their modification.

Figure 19:
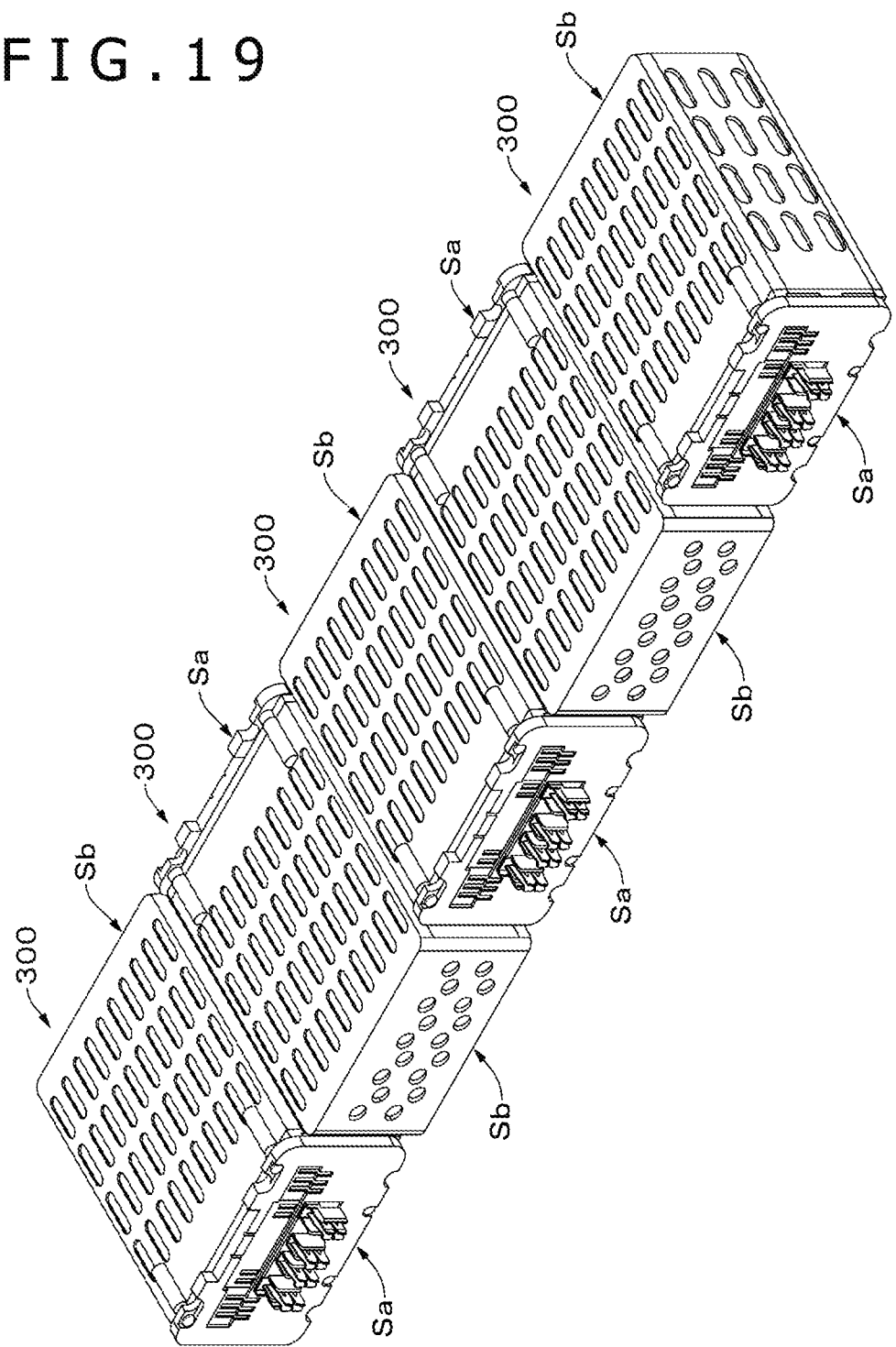
FIG. 19 is a perspective view illustrating a configuration of a composite module according to a sixth embodiment of the present technology.
Figure 20:
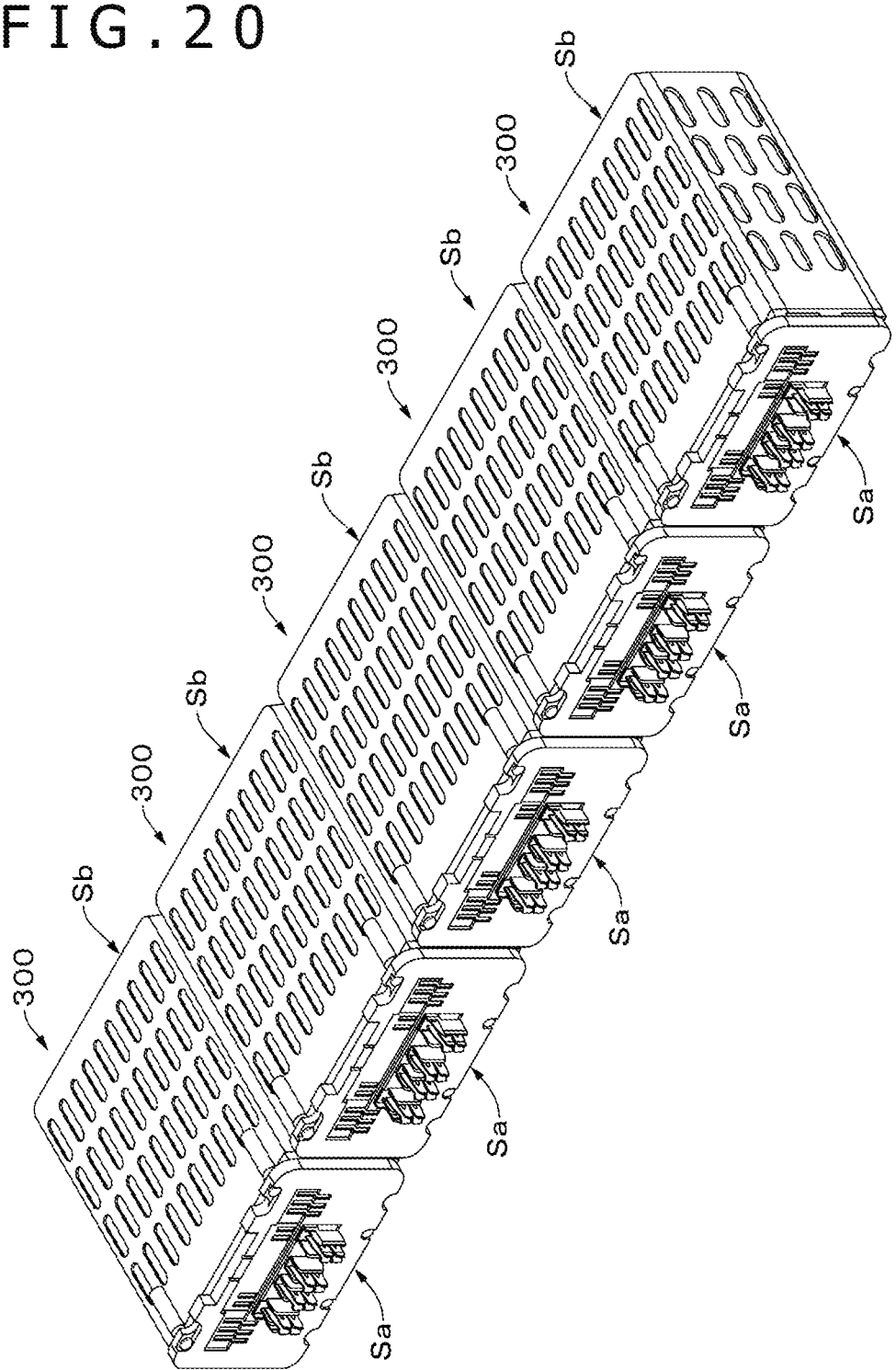
FIG. 20 is a perspective view illustrating a configuration of the composite module according to the sixth embodiment of the present technology.

As illustrated in FIG. 19, the composite module may be configured by arranging a plurality of battery modules 300 in one column so that their front surface Sa and rear surface Sb are alternately oriented in the same direction. Alternatively, the composite module may be configured by arranging the battery modules 300 in one column so that their front surface Sa and rear surface Sb are respectively oriented in the same direction as illustrated in FIG. 20. The composite module may be configured by stacking the battery modules 300 or by stacking a plurality of sets of the battery modules 300 arranged in one column.

7 Seventh Embodiment

A seventh embodiment of the present technology will now be described with reference to an electronic apparatus including a battery module according to the first or second embodiment or their modification.
[Configuration of Battery Pack and Electronic Apparatus]

Figure 21:
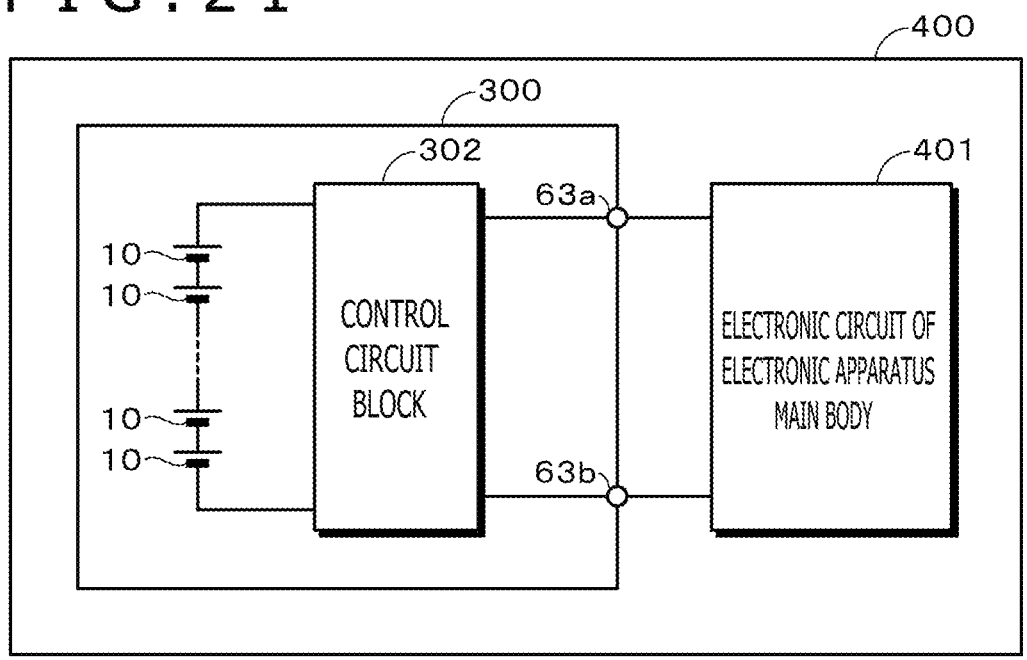
FIG. 21 is a block diagram illustrating a configuration of an electronic apparatus according to a seventh embodiment of the present technology.

An exemplary configuration of the electronic apparatus 400 according to the seventh embodiment of the present technology is described below with reference to FIG. 21. The electronic apparatus 400 includes a battery module 300 and an electronic circuit 401 of an electronic apparatus main body. The battery module 300 is electrically connected to the electronic circuit 401 via the external positive terminal 63*a* and the external negative terminal 63*b*. The electronic apparatus 400 is configured so that the battery module 300 is detachable, for example, by a user. However, the electronic apparatus 400 is not limited to such a configuration. The electronic apparatus 400 may alternatively be configured so that the battery module 300 is built in the electronic apparatus 400 and cannot be removed from the electronic apparatus 400 by the user.

When the battery module 300 is to be charged, the external positive terminal 63*a* and external negative terminal 63*b* of the battery module 300 are respectively connected to the positive terminal and negative terminal of a charger (not depicted). Meanwhile, when the battery module 300 is to be discharged (when the electronic apparatus 400 is to be used), the external positive terminal 63*a* and external negative terminal 63*b* of the battery module 300 are respectively connected to the positive terminal and negative terminal of the electronic circuit 401.

The electronic apparatus 400 may be, for example, a notebook personal computer, a tablet computer, a mobile phone (e.g., smartphone), a mobile information terminal (Personal Digital Assistants (PDA)), a display device (e.g., LCD, EL display, electronic paper), an image pickup device (e.g., digital still camera or digital video camera), an audio instrument (e.g., portable audio player), a game machine, a cordless phone handset, an electronic book, an electronic dictionary, a radio set, headphones, a navigation system, a memory card, a pacemaker, a hearing aid, a power tool, an electric shaver, a refrigerator, an air conditioner, a TV set, a stereo, a water heater, a microwave oven, a dishwasher, a washing machine, a drier, a lighting apparatus, a toy, a medical device, a robot, a load conditioner, or a traffic light.
(Electronic Circuit)

The electronic circuit 401 includes, for example, a CPU, a peripheral logic section, an interface section, and a storage section, and provides overall control of the electronic apparatus 400.
(Battery Module)

The battery module 300 is a battery module according to the first or second embodiment or their modification. The battery module according to the first or second embodiment is configured so that a plurality of batteries 10 are serially connected. However, the connection of the batteries is not limited to such a connection configuration. That is to say, the batteries may be connected in a parallel manner or in a serial/parallel manner.

The electronic apparatus 400 may alternatively include the composite module according to the sixth embodiment in place of the battery module 300 according to the first or second embodiment or their modification. Further, as another alternative, the electronic apparatus 400 may include the battery module according any one of the third to fifth embodiments and their modifications in place of the battery module 300 according to the first or second embodiment or their modification.

8 Eighth Embodiment

An eighth embodiment of the present technology will now be described with reference to a power storage system that includes, as power storage equipment, the battery module according to the first or second embodiment or their modification. The power storage system may be a simple power unit or any system that uses electric power. This power system is capable of storing electric power and may be, for example, a smart grid, a home energy management system (HEMS), or a vehicle.
[Configuration of Power Storage System]

Figure 22:
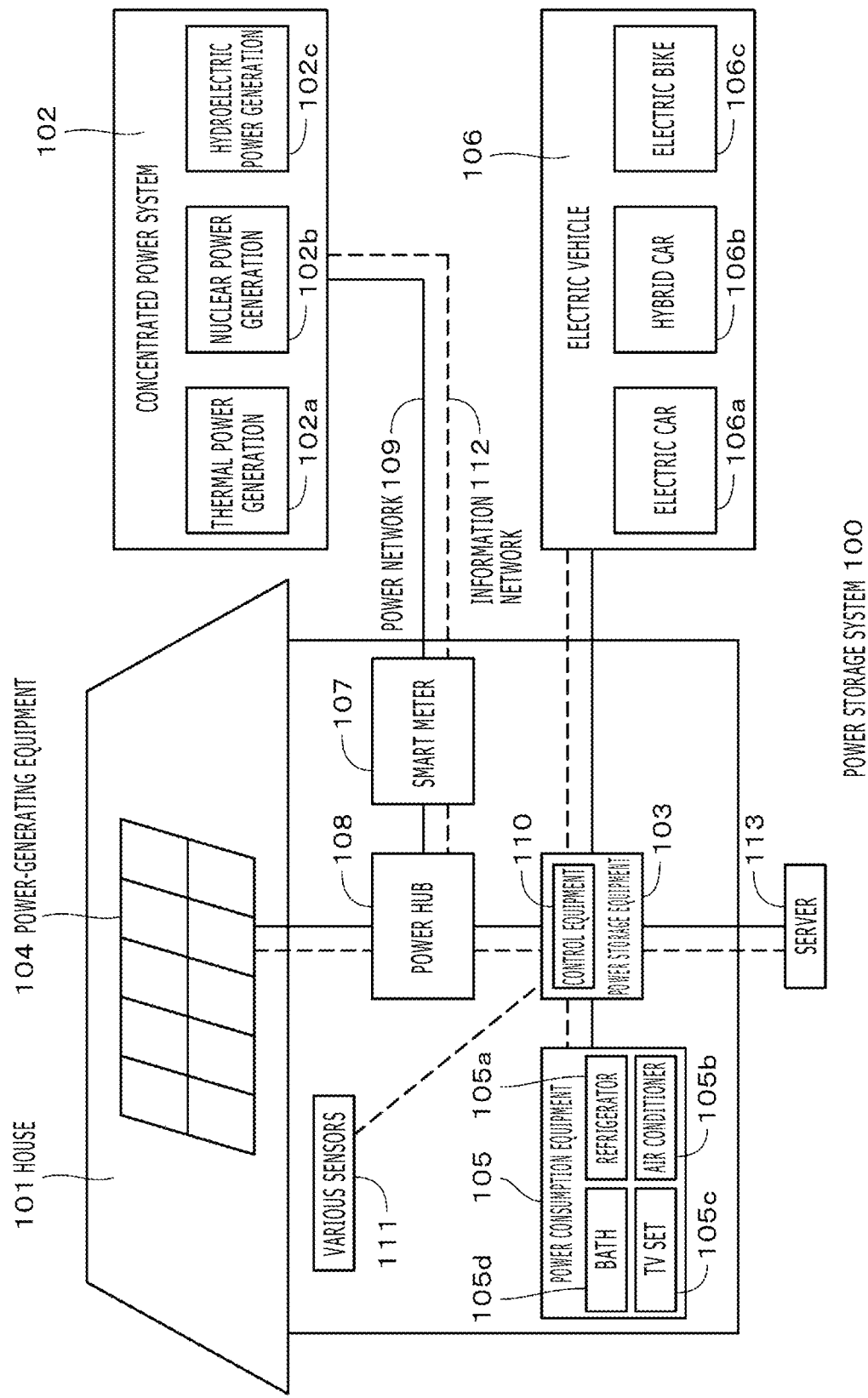
FIG. 22 is a schematic diagram illustrating a configuration of a power storage system according to an eighth embodiment of the present technology.

An exemplary configuration of the power storage system (power system) 100 according to the eighth embodiment is described below with reference to FIG. 22. The power storage system 100 is a household power storage system, and is configured so that electric power is supplied to power storage equipment 103 from a concentrated power system 102, which provides, for example, thermal power generation 102*a*, nuclear power generation 102*b*, and hydroelectric power generation 102*c*, via, for example, a power network 109, an information network 112, a smart meter 107, and a power hub 108. At the same time, electric power is also supplied to the power storage equipment 103 from an independent power supply such as household power-generating equipment 104. The electric power supplied to the power storage equipment 103 is stored. The power storage equipment 103 is used to supply electric power for use in a house 101. The same power storage system can be used not only for the house 101 but also for the other types of buildings.

Disposed in the house 101 are the household power-generating equipment 104, power consumption equipment 105, the power storage equipment 103, control equipment 110 for controlling various equipment, the smart meter 107, the power hub 108, and sensors 111 for acquiring various information. The various pieces of the equipment are connected to each other via the power network 109 and the information network 112. For example, a solar cell and a fuel cell are used as the household power-generating equipment 104, and generated electric power is supplied to the power consumption equipment 105 and/or the power storage equipment 103. The power consumption equipment 105 may be a refrigerator 105a, an air conditioner 105b, a television set 105c, or a bath 105d. Further, the power consumption equipment 105 may be an electric vehicle 106. The electric vehicle 106 is, for example, an electric car 106a, a hybrid car 106b, or an electric bike 106c.

The power storage equipment 103 includes the battery module according to the first or second embodiment or their modification. The smart meter 107 is capable of measuring the amount of commercial power usage and transmitting the measured amount to an electric power company. The power network 109 may be a direct current power supply network, an alternating current power supply network, a non-contact power supply network, or a combination of these.

The various sensors 111 may be, for example, a human sensor, an illuminance sensor, an object sensor, a power consumption sensor, a vibration sensor, a contact sensor, a temperature sensor, and an infrared sensor. Information acquired by the various sensors 111 is transmitted to the control equipment 110. The information from the sensors 111 can be used to determine, for example, weather conditions and human conditions and automatically control the power consumption equipment 105 in order to minimize the amount of energy consumption. Further, the control equipment 110 is capable of transmitting information about the house 101, for example, to an external electric power company through the Internet.

The power hub 108 performs processes, for example, for power line branching and direct current-to-alternating current conversion. A UART (Universal Asynchronous Receiver-Transceiver) or other communication interface or a sensor network compliant with a wireless communication standard such as Bluetooth (registered trademark), ZigBee, or Wi-Fi may be used to communicate with the information network 112, which is to be connected to the control equipment 110. The Bluetooth (registered trademark) standard is applied to multimedia communication and capable of establishing one-to-many communication. The ZigBee standard uses the physical layer provided by the IEEE (Institute of Electrical and Electronics Engineers) 802.15.4 standard. IEEE 802.15.4 is the name of a short-distance wireless network standard called "PAN (Personal Area Network)" or "WPAN (Wireless Personal Area Network)."

The control equipment 110 is connected to an external server 113. The server 113 may be managed by the house 101, an electric power company, or a service provider. Information transmitted and received by the server 113 includes, for example, power consumption information, lifestyle information, electricity charges, weather information, natural disaster information, and electricity transaction. These items of information may be transmitted and received by in-home power consumption equipment (e.g., a TV set), but may also be transmitted and received by out-of-home power consumption equipment (e.g., a mobile phone). These items of information may be displayed on an apparatus having a display function, such as a TV set, a mobile phone, or a PDA (Personal Digital Assistants).

The control equipment 110, which controls various sections, includes, for example, a CPU (Central Processing Unit), a RAM (Random Access Memory), and a ROM (Read Only Memory). In the example of FIG. 22, the control equipment 110 is placed in the power storage equipment 103. The control equipment 110 is connected via the information network 112 to the power storage equipment 103, the household power-generating equipment 104, the power consumption equipment 105, the various sensors 111, and the server 113, and is capable of adjusting the amount of commercial power usage and the amount of electric power generation. Further, the server 113 may be capable of making electricity transactions in an electricity market.

As described above, not only the electric power generated by the concentrated power system 102, which provides, for example, thermal power generation 102a, nuclear power generation 102b, and hydroelectric power generation 102c, but also the electric power generated by the household power-generating equipment 104 (solar power generation or wind power generation) can be stored in the power storage equipment 103. Therefore, even when the electric power generated by the household power-generating equipment 104 varies, control can be exercised to supply a fixed amount of electric power to the outside or discharge electricity as needed. This makes it possible, for example, to store electric power derived from solar power generation in the power storage equipment 103, store midnight electric power, which is inexpensive at night, in the power storage equipment, and use electric power discharged from the power storage equipment 103 during daytime when electricity charges are high.

The above-described example relates to a case where the control equipment 110 is placed in the power storage equipment 103. Alternatively, however, the control equipment 110 may be placed in the smart meter 107 or used as a free-standing item. In addition, the power storage system 100 may be used for a plurality of homes in a complex housing or for a plurality of detached houses. Further, the power storage system 100 may include the composite module according to the sixth embodiment instead of the battery module according to the first or second embodiment or their modification. Moreover, the power storage system 100 may include the battery module according to any one of the third to fifth embodiments and their modifications instead of the battery module 300 according to the first or second embodiment or their modification.

9 Ninth Embodiment

A ninth embodiment of the present technology will now be described with reference to an electric vehicle that includes the battery module according to the first or second embodiment or their modification.

[Configuration of Electric Vehicle]

Figure 23:
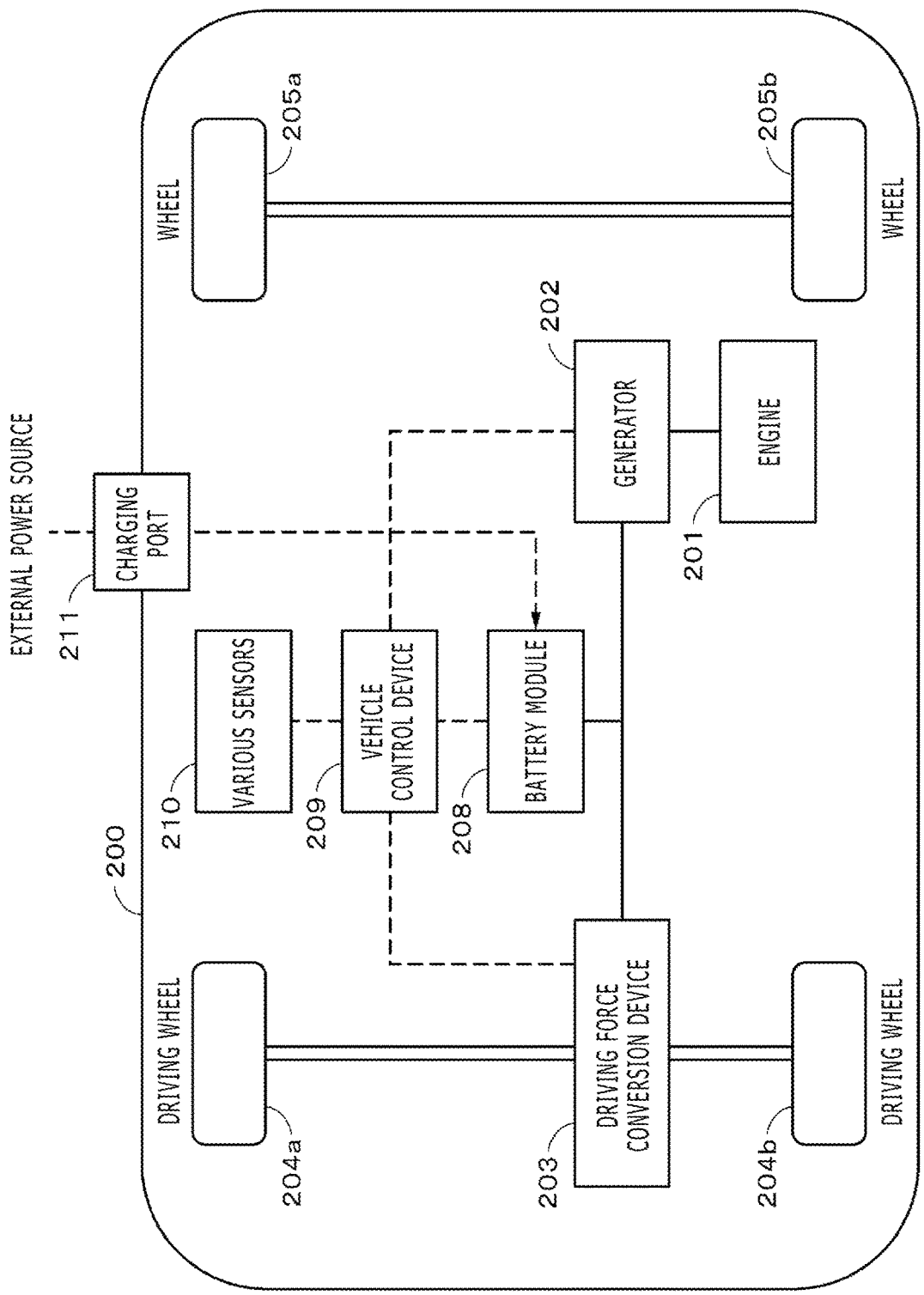
FIG. 23 is a schematic diagram illustrating a configuration of an electric vehicle according to a ninth embodiment of the present technology.

A configuration of the electric vehicle according to the ninth embodiment of the present technology is described below with reference to FIG. 23. A hybrid vehicle 200 illustrated in FIG. 23 uses a series hybrid system. The series hybrid system permits a vehicle to be driven by an electric power-to-driving force conversion device 203 that uses electric power generated by an engine-driven generator or the generated electric power temporarily stored in a battery.

Mounted in the hybrid vehicle 200 are an engine 201, a generator 202, the electric power-to-driving force conversion device 203, a driving wheel 204a, a driving wheel 204b, a wheel 205a, a wheel 205b, a battery module 208, a vehicle control device 209, various sensors 210, and a charging port 211. The battery module according to the first or second embodiment or their modification is used as the battery module 208.

The hybrid vehicle 200 travels by using the electric power-to-driving force conversion device 203 as its driving power source. For example, an electric motor is used as the electric power-to-driving force conversion device 203. Electric power from the battery module 208 activates the electric power-to-driving force conversion device 203 so that its torque is transmitted to the driving wheels 204a and 204b. Either an alternating-current motor or a direct-current motor may be used as the electric power-to-driving force conversion device 203 when a direct current-to-alternating current converter (DC-AC converter) or an alternating current-to-direct current converter (AC-DC converter) is used at a relevant place. The various sensors 210 control the engine rotation speed via the vehicle control device 209 or control the opening of a throttle vale (not depicted), that is, the throttle valve opening. The various sensors 210 include, for example, a speed sensor, an acceleration sensor, and an engine rotation speed sensor.

The torque of the engine 201 is transmitted to the generator 202. The transmitted torque causes the generator 202 to generate electric power. The generated electric power can be stored in the battery module 208.

When the hybrid vehicle 200 is decelerated by a braking mechanism (not depicted), a resistive force generated during such deceleration is added to the electric power-to-driving force conversion device 203 as the torque. The torque then causes the electric power-to-driving force conversion device 203 to generate regenerative electric power. The generated regenerative electric power is stored in the battery module 208.

When the battery module 208 is connected via the charging port 211 to an external power source for the hybrid vehicle 200, electric power can be received from the external power source via the charging port 211 acting as an input port, and then stored.

Although not depicted, the hybrid vehicle 200 may include an information processing device that processes information on vehicle control in accordance with information about a battery in the battery module 208. Such an information processing device may, for example, display a remaining battery level in accordance with information about the amount of electric power remaining in the battery included in the battery module 208.

The above description relates to a series hybrid vehicle driven by an electric motor that uses electric power generated by an engine-driven generator or the generated electric power temporarily stored in a battery. However, the present technology is also effectively applicable to a parallel hybrid vehicle that uses both the output of an engine and the output of an electric motor as a driving power source, and travels by selecting one of three different modes, namely, an engine-only mode, an electric motor-only mode, or an engine-electric motor mode. Further, the present technology is also effectively applicable to a so-called electric vehicle, namely, a vehicle that is driven by a drive motor alone without using an engine. Furthermore, the hybrid vehicle 200 may include the composite module according to the sixth embodiment instead of the battery module 208. Moreover, the hybrid vehicle 200 may include the battery module according to any one of the third to fifth embodiments and their modifications instead of the battery module 300 according to the first or second embodiment or their modification.

10 Tenth Embodiment

Figure 24:
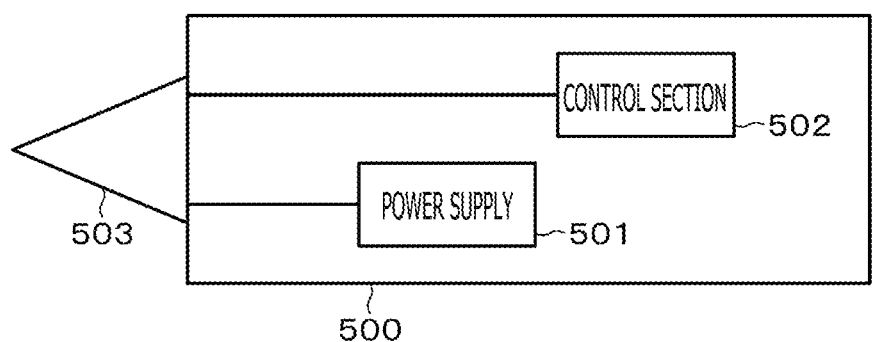
FIG. 24 is a schematic diagram illustrating a configuration of a power tool according to a tenth embodiment of the present technology.

As illustrated in FIG. 24, a power tool according to a tenth embodiment of the present technology is, for example, an electric drill. The power tool includes a tool main body 500, a control section 501, and a power supply 502. The control section 501 and the power supply 502 are incorporated in the tool main body 500, which is formed, for example, a plastic material. The power tool also includes a drill section 503, which is a movable section operably (rotatably) attached to the tool main body 500.

The control section 501 controls the overall operation of the power tool (including the usage of the power supply 502) and includes, for example, a CPU. The battery module according to the first or second embodiment or their modification is used as the power supply 502. Alternatively, the composite module according to the sixth embodiment may be used as the power supply 502 instead of the above-mentioned battery module. As another alternative, the power module according to any one of the third to sixth embodiments and their modifications may be used as the power supply 502 instead of the battery module according to the first or second embodiment or their modification. In response to an operation of an operating switch (not depicted), the control section 501 supplies electric power from the power supply 502 to the drill section 503.

While embodiments of the present technology have been described in detail, the present technology is not limited to the above-described embodiments. Various modifications can be made based on the technical ideas of the present technology.

For example, the configurations, methods, processes, shapes, materials, and numerical values mentioned in conjunction with the above-described embodiments are merely exemplary, and different configurations, methods, processes, shapes, materials, and numerical values may alternatively be used as needed.

Further, for example, the configurations, methods, processes, shapes, materials, and numerical values mentioned in the above-described embodiments may be combined without departing from the spirit of the present technology.

Further, the present technology may adopt the following configurations.

(1) A battery module including:
a plurality of flat or square type batteries that each have a positive terminal and a negative terminal;
a holder that has an opening, and retains the batteries in such a manner that the positive terminal and the negative terminal are positioned toward the opening, and that the principal surfaces of the batteries face each other;
a cover that is disposed over the opening;
a circuit board that is disposed over the cover; and
a plurality of connection members that are disposed between the cover and the circuit board to electrically connect the positive terminal and the negative terminal;
in which some of the connection members retain a peripheral portion of the circuit board.

(2) The battery module as described in (1) above, in which the connection members are shaped like a plate; and some of the connection members are bent inward from the periphery of one surface of the circuit board that is opposite the other surface facing the cover.

(3) The battery module as described in (1) or (2) above, in which the junction between the positive terminal and the connection members and the junction between the negative terminal and the connection members are sandwiched between the cover and the circuit board.

(4) The battery module as described in any one of (1) to (3) above, in which the junction between the positive terminal and the connection members and the junction between the negative terminal and the connection members are bent and disposed between the cover and the circuit board.

(5) The battery module as described in any one of (1) to (4) above, in which the circuit board includes a plurality of connection portions on a peripheral portion of one surface of the circuit board that is opposite the other surface facing the cover; and some of the connection members are joined to the connection portions.

(6) The battery module as described in (5) above, further including:
an external connection terminal that is connected to the connection portions.

(7) The battery module as described in (5) above, further including:
a control section that is connected to the connection portions.

(8) The battery module as described in any one of (1) to (7) above, in which the holder retains the batteries in such a manner that the principal surfaces of the batteries are positioned apart from each other.

(9) The battery module as described in any one of (1) to (8) above, in which the holder retains the batteries in such a manner that the positive terminals and negative terminals of neighboring batteries form two columns, and that the positive terminals and the negative terminals are alternately disposed in the columns.

(10) The battery module as described in any one of (1) to (9) above, in which the connection members connect the positive terminals and the negative terminals alternately in the two columns.

(11) The battery module as described in any one of (1) to (10) above, further including:
a case that accommodates the holder;
in which the holder and the case are positioned apart from each other.

(12) The battery module as described in any one of (1) to (11) above, further including:
a buffer that is disposed at least either between the batteries and the holder or between the batteries and the cover.

(13) The battery module as described in any one of (1) to (12) above, in which the holder includes a through-hole.

(14) The battery module as described in any one of (1) to (13) above, in which the cover is formed of a plurality of cover members provided for the each batteries.

(15) The battery module as described in any one of (1) to (14) above, in which the batteries each accommodate a battery element and a flexible cladding, the flexible cladding being adapted to accommodate the battery element.

(16) The battery module as described in any one of (1) to (15) above, further including:
a first connection member that is to be electrically connected to the positive terminals; and
a second connection member that is to be electrically connected to the negative terminals;
in which the first connection member and the second connection member movably retain the circuit board.

(17) The battery module as described in any one of (1) to (15) above, further including:
an additional circuit board that is disposed opposite the opening; and
a connection member that electrically connects the circuit board to the additional circuit board and movably retains the additional circuit board.

(18) A battery module including:
a plurality of flat or square type batteries that each have a positive terminal and a negative terminal;
a holder that has an opening, and retains the batteries in such a manner that the positive terminal and the negative terminal are positioned toward the opening, and that the principal surfaces of the batteries face each other;
a cover that is disposed over the opening;
a circuit board that is disposed over the cover; and
a plurality of connection members that are electrically connected to at least either the positive terminal or the negative terminal;
in which the connection members retain a peripheral portion of the circuit board.

(19) A power tool including:
the battery module described in any one of (1) to (18) above; and
a movable section that receives electric power from the battery module.

(20) An electronic apparatus that receives electric power from the battery module described in any one of (1) to (18) above.

(21) An electric vehicle including:
the battery module described in any one of (1) to (18) above;
a conversion device that receives electric power from the battery module and converts the electric power to a vehicle driving force; and
a control device that performs information processing on vehicle control in accordance with information about the battery module.

(22) Power storage equipment that includes the battery module described in any one of (1) to (18) above, and supplies electric power to an electronic apparatus connected to the battery module.

(23) A power system that includes the battery module described in any one of (1) to (18) above, and receives electric power from the battery module.

REFERENCE SIGNS LIST

10 Laminate film battery
20, 620 Holder (supporter)
31, 32 Buffer
40, 640 Cover
51, 52a, 52b, 631, 632, 633 Tab (connection member)
52c, 52d Tab (first and second connection members)
60 Circuit board
70 Front member
610 Battery unit
650 Main circuit board (circuit board)
660 Input/output terminal circuit board (additional circuit board)
671, 672 Busbar (connection member)

The invention claimed is:
1. A battery module comprising:
a plurality of flat or square type batteries that each have a positive terminal and a negative terminal;
a holder that has an opening, and retains the batteries in such a manner that the positive terminal and the negative terminal are positioned toward the opening, and that the principal surfaces of the batteries face each other;
a cover that is disposed over the opening;
a circuit board that is disposed over the cover; and
a plurality of connection members that are disposed between the cover and the circuit board to electrically connect the positive terminal and the negative terminal;
wherein some of the connection members retain a peripheral portion of the circuit board,
wherein the some of the connection members include an intermediate portion and a junction end, wherein the junction end is bent from the intermediate portion to form a junction with one of the positive terminal and the negative terminal, and wherein the junction overlaps with the intermediate portion in a planar view.

2. The battery module according to claim 1, wherein the connection members are shaped like a plate; and some of the connection members are bent inward from the periphery of a first surface of the circuit board that is opposite a second surface facing the cover.

3. The battery module according to claim 1, wherein the junction between the positive terminal and the connection members and the junction between the negative terminal and the connection members are sandwiched between the cover and the circuit board.

4. The battery module according to claim 1, wherein the junction between the positive terminal and the connection members and the junction between the negative terminal and the connection members are bent and disposed between the cover and the circuit board.

5. The battery module according to claim 1, wherein the circuit board includes a plurality of connection portions on a peripheral portion of the first surface of the circuit board that is opposite the second surface facing the cover; and some of the connection members are joined to the connection portions.

6. The battery module according to claim 5, further comprising:
an external connection terminal that is connected to the connection portions.

7. The battery module according to claim 5, further comprising:
a control section that is connected to the connection portions.

8. The battery module according to claim 1, wherein the holder retains the batteries in such a manner that the principal surfaces of the batteries are positioned apart from each other.

9. The battery module according to claim 1, wherein the holder retains the batteries in such a manner that the positive terminals and negative terminals of neighboring batteries form two columns, and that the positive terminals and the negative terminals are alternately disposed in the columns.

10. The battery module according to claim 9, wherein the connection members connect the positive terminals and the negative terminals alternately in the two columns.

11. The battery module according to claim 1, further comprising:
a case that accommodates the holder;
wherein the holder and the case are positioned apart from each other.

12. The battery module according to claim 1, further comprising:
a buffer that is disposed at least either between the batteries and the holder or between the batteries and the cover.

13. The battery module according to claim 1, wherein the holder includes a through-hole.

14. The battery module according to claim 1, wherein the cover is formed of a plurality of cover members provided respectively for the each batteries.

15. The battery module according to claim 1, wherein the batteries each accommodate a battery element and a flexible cladding, the flexible cladding being adapted to accommodate the battery element.

16. The battery module according to claim 1, further comprising:
a first connection member that is to be electrically connected to the positive terminals; and
a second connection member that is to be electrically connected to the negative terminals;
wherein the first connection member and the second connection member movably retain the circuit board.

17. The battery module according to claim 1, further comprising:
an additional circuit board that is disposed opposite the opening; and
a connection member that electrically connects the circuit board to the additional circuit board and movably retains the additional circuit board.

18. A battery module comprising:
a plurality of flat or square type batteries that each have a positive terminal and a negative terminal;
a holder that has an opening, and retains the batteries in such a manner that the positive terminal and the negative terminal are positioned toward the opening, and that the principal surfaces of the batteries face each other;
a cover that is disposed over the opening;
a circuit board that is disposed over the cover; and
a plurality of connection members that are electrically connected to at least either the positive terminal or the negative terminal;
wherein the connection members retain a peripheral portion of the circuit board,
wherein the connection members include an intermediate portion, and a junction end,
wherein the junction end is bent from the intermediate portion to form a junction with one of the positive terminal and the negative terminal, and
wherein the junction overlaps with the intermediate portion in a planar view.

19. A power tool comprising:
the battery module according to claim 1; and
a movable section that receives electric power from the battery module.

20. An electronic apparatus that receives electric power from the battery module according to claim 1.

* * * * *